United States Patent
Kawabuchi et al.

(10) Patent No.: US 8,925,405 B2
(45) Date of Patent: Jan. 6, 2015

(54) LINEAR-MOTION TELESCOPIC MECHANISM AND ROBOT ARM HAVING LINEAR-MOTION TELESCOPIC MECHANISM

(75) Inventors: Ichiro Kawabuchi, Tokyo (JP); Woo-Keun Yoon, Ibaraki (JP); Tetsuo Kotoku, Ibaraki (JP)

(73) Assignees: Kawabuchi Mechanical Engineering Laboratory, Inc., Tokyo (JP); National Institute of Advanced Industrial Science and Technology, Tokyo (JP)

( * ) Notice: Subject to any disclaimer, the term of this patent is extended or adjusted under 35 U.S.C. 154(b) by 639 days.

(21) Appl. No.: 13/140,130

(22) PCT Filed: Dec. 17, 2009

(86) PCT No.: PCT/JP2009/006973
§ 371 (c)(1),
(2), (4) Date: Jun. 16, 2011

(87) PCT Pub. No.: WO2010/070915
PCT Pub. Date: Jun. 24, 2010

(65) Prior Publication Data
US 2012/0024091 A1  Feb. 2, 2012

(30) Foreign Application Priority Data

Dec. 19, 2008  (JP) ................. 2008-324408
Dec. 19, 2008  (JP) ................. 2008-324430

(51) Int. Cl.
*F16H 19/06*  (2006.01)
*B25J 18/02*  (2006.01)
(Continued)

(52) U.S. Cl.
CPC .............. *B25J 18/025* (2013.01); *B25J 9/045* (2013.01); *B25J 9/046* (2013.01);
(Continued)

(58) Field of Classification Search
USPC ............ 74/37, 89.2, 89.35; 901/8, 25, 28, 30, 901/47; 294/213
See application file for complete search history.

(56) References Cited

U.S. PATENT DOCUMENTS 4,473,365 A * 9/1984 Lapeyre .................. 474/212
(Continued)

FOREIGN PATENT DOCUMENTS

CN  2060469 U  8/1990
(Continued)

OTHER PUBLICATIONS

Chinese Office Action for corresponding Chinese Application No. 200980150832.9 issued on May 31, 2013.
(Continued)

*Primary Examiner* — Troy Chambers
*Assistant Examiner* — Zakaria Elahmadi
(74) *Attorney, Agent, or Firm* — Renner, Otto, Boisselle & Sklar, LLP

(57) ABSTRACT

A linear-motion telescopic mechanism according to the present invention includes a plurality of block members (22) by which an arbitrary arm length is achieved in such a manner that the plurality of block member (22) are rigidly connected to each other so as to elongate a linear-motion telescopic joint (J3). On the other hand, by separating the plurality of block members (22) one by one from a rigid alignment of the plurality of block members (22), the linear-motion telescopic joint (J3) is contracted. The block members (22) unfixed from the rigid alignment are still serially connected but not in a rigid manner. That is, the block members (22) thus unfixed can be flexed in any directions, and therefore can be housed inside a support member (1) in a compact manner. This arrangement can provide a linear-motion telescopic mechanism (i) which enhances safety by eliminating such a risk, inevitable for a typical robot arm having an elbow joint, that an object around the robot arm gets caught between arm sections when the elbow joint is closed, and (ii) which can reduce a space to be occupied by the robot arm.

8 Claims, 23 Drawing Sheets

(51) Int. Cl.
*B25J 9/04* (2006.01)
*B25J 18/06* (2006.01)
*F16G 13/20* (2006.01)
*F16H 25/24* (2006.01)

(56) References Cited

U.S. PATENT DOCUMENTS

| | | | |
|---|---|---|---|
| 4,537,084 A | 8/1985 | Passemard et al. | |
| 4,588,347 A * | 5/1986 | Murta | 414/685 |
| 4,831,893 A | 5/1989 | Obama et al. | |
| 6,224,037 B1 * | 5/2001 | Novick | 254/95 |
| 6,936,042 B2 * | 8/2005 | Wallace et al. | 606/1 |
| 7,090,086 B2 * | 8/2006 | Dupre et al. | 212/350 |
| 7,270,619 B2 * | 9/2007 | Bourc'His | 474/202 |
| 7,370,896 B2 * | 5/2008 | Anderson et al. | 294/106 |
| 7,621,078 B2 * | 11/2009 | Phelan et al. | 52/121 |
| 2006/0156851 A1 * | 7/2006 | Jacobsen et al. | 74/490.01 |
| 2008/0296920 A1 * | 12/2008 | Kipping et al. | 294/88 |
| 2009/0031842 A1 * | 2/2009 | Kawai et al. | 74/490.01 |
| 2009/0071281 A1 * | 3/2009 | Fisk et al. | 74/490.03 |
| 2009/0127530 A1 * | 5/2009 | Takeda | 254/387 |
| 2013/0165908 A1 * | 6/2013 | Purdy et al. | 606/1 |
| 2013/0239734 A1 * | 9/2013 | Hinman | 74/490.04 |
| 2014/0207151 A1 * | 7/2014 | Verbeek | 606/130 |

FOREIGN PATENT DOCUMENTS

| | | |
|---|---|---|
| EP | 0 074 883 A1 | 3/1983 |
| JP | 61-045168 | 3/1986 |
| JP | 63-84882 A | 4/1988 |
| JP | 01-93733 | 6/1989 |
| JP | 03-000351 A | 1/1991 |
| JP | 04-029660 | 1/1992 |
| JP | 06-039758 | 2/1994 |
| JP | 07-116986 | 5/1995 |
| JP | 07-164369 | 6/1995 |
| JP | 07-194610 | 8/1995 |
| JP | 2007-290068 | 11/2007 |

OTHER PUBLICATIONS

International Search Report for corresponding International Application No. PCT/JP2009/006973 mailed Mar. 23, 2010 (with English translation).

* cited by examiner (a)

(b)

US 8,925,405 B2

LINEAR-MOTION TELESCOPIC MECHANISM AND ROBOT ARM HAVING LINEAR-MOTION TELESCOPIC MECHANISM

TECHNICAL FIELD

The present invention relates to a linear-motion telescopic mechanism. More specifically, the present invention relates to (i) a linear-motion telescopic mechanism which enhances safety by eliminating such a risk inevitable for a typical robot arm having an elbow joint that an object placed in vicinity to the robot arm is caught between sections of the robot arm when the elbow joint is closed, and which has a reduced space to be occupied by the robot arm, and (ii) a robot arm having the linear-motion telescopic mechanism.

BACKGROUND ART

In recent years, robot arms are being used cooperatively with people among production facilities, and also used for assistive aids in daily life to maintain or improve the quality of life of elderly people and people with disabilities.

One typical example of the robot arms is a robot arm having an arrangement as illustrated in (a) and (b) of FIG. 27. That is, the robot arm includes a base portion 100, an end effector 101, and arm sections 102 serially connected via rotational joints 103 between the base portion 100 and the end effector 101. However, in this arrangement, the arm sections 102 largely project laterally from a line (a dotted line in the figure) that connects the base portion 100 and the end effector 101, when the robot arm is folded as illustrated in (b) of FIG. 27. This increases such a risk that a projected portion strikes or hits an object around the robot arm. Further, there is a risk that an object around the robot arm may be caught between the arm sections 102. In view of this, it can be said that this robot arm is not suitable especially as an assistive robot arm used in daily life.

One exemplary structure of a robot arm that can reduce these risks may be a thin-stick-like structure in which an end effector and a base portion are linearly connected via a stick-like member. (a) to (d) of FIG. 28 illustrate 4 types of telescopic robot arms having a "linear-motion telescopic mechanism" in which the stick-like member performs linear telescopic motion, whereby an arm function works out. (a) of FIG. 28 is a view illustrating an ideal thin telescopic arm in which any mechanism having a telescopic function is provided. (b) to (d) of FIG. 28 illustrate telescopic arms that symbolize some concrete mechanisms. In these arrangements, a space to be occupied by arm sections is minimized as compared with that of the arrangement in FIG. 27, which advantageously minimizes a degree of obstruction in user's view. However, in these three types of arrangements of (b) to (d) of FIG. 28, in order to achieve sufficient stiffness, it is necessary to design the real mechanisms thick in a contraction state, thereby resulting in that the appearances of these mechanisms look quite unlike the appearance of the ideal arm section illustrated in (a) of FIG. 28. In other words, the mechanisms of (b) to (c) of FIG. 28 must be of an undesirably large shape. A general reason why these mechanisms should be made so thick is as follows: sufficient stiffness requires sufficient thickness of the arm sections; and a sufficient moving space of the end effector requires a sufficient difference in arm length between an elongate state and a contraction state. As a result, a volume, i.e., a product of the thickness and the length, of an arm structure for an unnecessary portion in the contraction state (hereinafter referred to as an unnecessary portion of the arm section) gets quite bulky, and a volume necessary to house the unnecessary portion makes the base portion and its auxiliary mechanism larger.

Besides the robot arms exemplified above, there have been reported many robot arms having a linear-motion telescopic mechanism (see Patent Literatures 1, 2, 3). However, these robot arms are not produced from the viewpoint of avoiding the aforementioned risk of getting caught between arm sections or for the purpose of being used beside people. In view of this, it is difficult to use these robot arms beside people in daily life or among production facilities, which would be a problem to be solved in the present invention.

Further, a two-legged robot having a linear-motion link mechanism has been reported (see Patent Literature 4). However, the two-legged robot is a very ambitious device, and therefore unsuitable for a robot arm, which requires weight saving.

CITATION LIST

Patent Literatures

Patent Literature 1
Japanese Patent Application Publication, Tokukaisho, No. 61-45168 A (Publication Date: Mar. 5, 1986)
Patent Literature 2
Japanese Patent Application Publication, Tokukaisho, No. 63-84882 A (Publication Date: Apr. 15, 1988)
Patent Literature 3
Japanese Patent Application Publication, Tokukaihei, No. 6-39758 A (Publication Date: Feb. 15, 1994)
Patent Literature 4
Japanese Patent Application Publication, Tokukai, No. 2007-290068 (Publication Date: Nov. 8, 2007)

SUMMARY OF INVENTION

Technical Problem

Development of a robot arm intended to be used beside people requires (i) to reduce, to the greatest possible extent, an occurrence of a problem that an object around the robot arm is caught by rotational joints, and (ii) to save a weight of a structure so as to reduce impact caused when the robot arm hits people, as much as possible.

Solution to Problem

The present invention is accomplished in view of the above problems. An object of the present invention is to provide a linear-motion telescopic mechanism and a robot arm, each aimed at being used beside people in terms of distance.

Inventors of the present invention found a fact that employment of a linear-motion telescopic mechanism constituted by a plurality of block members as a robot arm can markedly reduce the risk, which occurs conventionally, that an object around the robot arm is caught between sections of the robot arm. Based on the fact, the inventors accomplished the present invention.

That is, in order to achieve the above object, a linear-motion telescopic mechanism according to the present invention includes: a block-member group including a plurality of block members; moving means which moves the plurality of block members and which has a function of fixing a given block member to another block member in the block-member group and of unfixing fixed block members one by one, the moving means causing a part of or all of the plurality of block members in the block-member group to align in a linear and rigid manner to form a rigid alignment, and unfixing a part of or all of the rigid alignment to disengage the block members one by one, so that the rigid alignment serves as a linear rigid arm section that is freely variable in length.

Further, the inventors of the present invention studied on the problem that an object around an arm section gets caught between arm sections, which occurs in the arrangement shown in FIG. 27, and the robot arms of the linear telescopic motion type exemplified in FIG. 28. As a result of their study, the inventors of the present invention found that an ideal robot arm can be produced by employing an arm section having a linear-motion telescopic mechanism in which a stick-like arm section is divided into small blocks so that blocks of an unnecessary part of the arm section can be removed largely. Based on the fact, the inventors accomplished the present invention.

In order to achieve the above object, a robot arm according to the present invention includes: an installation section to be fixed to a desk, a floor, or the like; a support member connected to the installation section via a first rotational joint; a straight-link arm section connected to the support member via a second rotational joint that is rotatable in a vertical direction to the first rotational joint; and an end effector provided at an end of the arm section, the arm section having a linear-motion telescopic mechanism, (i) which allows the arm section to be elongated or contracted to an arbitrary arm length and (ii) which is constituted by structural members provided in advance to achieve a maximum arm length, the linear-motion telescopic mechanism being arranged to separate, from the arm section, a part of the structural members that is beyond the arbitrary arm length and to house the part into a space deviating from a central axis of the arm section along an elongate direction of the arm section.

Advantageous Effects of Invention

As described above, in order to achieve the above object, a linear-motion telescopic mechanism according to the present invention includes: a block-member group including a plurality of block members; moving means which moves the plurality of block members and which has a function of fixing a given block member to another block member in the block-member group and of unfixing fixed block members one by one, the moving means causing a part of or all of the plurality of block members in the block-member group to align in a linear and rigid manner to form a rigid alignment, and unfixing a part of or all of the rigid alignment to disengage the block members one by one, so that the rigid alignment serves as a linear rigid arm section that is freely variable in length.

Further, as described above, in order to achieve the above object, a robot arm according to the present invention includes: an installation section to be fixed to a desk, a floor, or the like; a support member connected to the installation section via a rotatable first rotational joint; a straight-link arm section connected to the support member via a second rotational joint that is rotatable in a vertical direction to the first rotational joint; and an end effector provided at an end of the arm section, the arm section having a linear-motion telescopic mechanism, (i) which allows the arm section to be elongated or contracted to an arbitrary arm length and (ii) which is constituted by structural members provided in advance to achieve a maximum arm length, the linear-motion telescopic mechanism being arranged to separate, from the arm section, a part of the structural members that is beyond the arbitrary arm length and to house the part into a space deviating from a central axis of the arm section along an elongate direction of the arm section.

With the above arrangement, it is possible to provide a linear-motion telescopic mechanism and a robot arm, each of which significantly reduce an occurrence of a conventional problem, i.e., the risk that an object is caught between sections of the robot arm, and each of which has a reduced space to be occupied by the robot arm.

DESCRIPTION OF EMBODIMENTS

The inventors of the present invention found a fact that it is possible to markedly reduce the risk that an object gets caught between sections of a robot arm and to successfully reduce a space to be occupied by the robot arm, by employing a linear-motion telescopic mechanism including a linear-motion telescopic joint constituted by a plurality of block members, as an arm section of the robot arm. The inventors accomplished the invention based on the fact.

A robot arm equipped with a linear-motion telescopic mechanism according to the present invention can be used as not only an industrial robot arm but also an assistive apparatus such as an assistive robot that works as a hand to help people to do their work in daily life.

Embodiment 1

A linear-motion telescopic mechanism according to the present invention includes a block-member group constituted by a plurality of block members, and moving means which moves the plurality of block members and which has a function of fixing a given block member to another block member in the block-member group and for unfixing fixed block members one by one. In the linear-motion telescopic mechanism, the moving means causes a part of or all of the plurality of block members in the block-member group to align in a linear and rigid manner to form a rigid alignment, and unfixes a part of or all of the rigid alignment to disengage the block members one by one, so that the rigid alignment serves as a linear rigid arm section that is freely variable in length.

The following describes the linear-motion telescopic mechanism according to the present invention more specifically, by referring to a robot arm as one embodiment, based on FIG. 1 to FIG. 15. For convenience for explanation, the whole linear-motion telescopic mechanism may be regarded as a single movement joint and referred to as a linear-motion telescopic joint J3.

Figure 1:
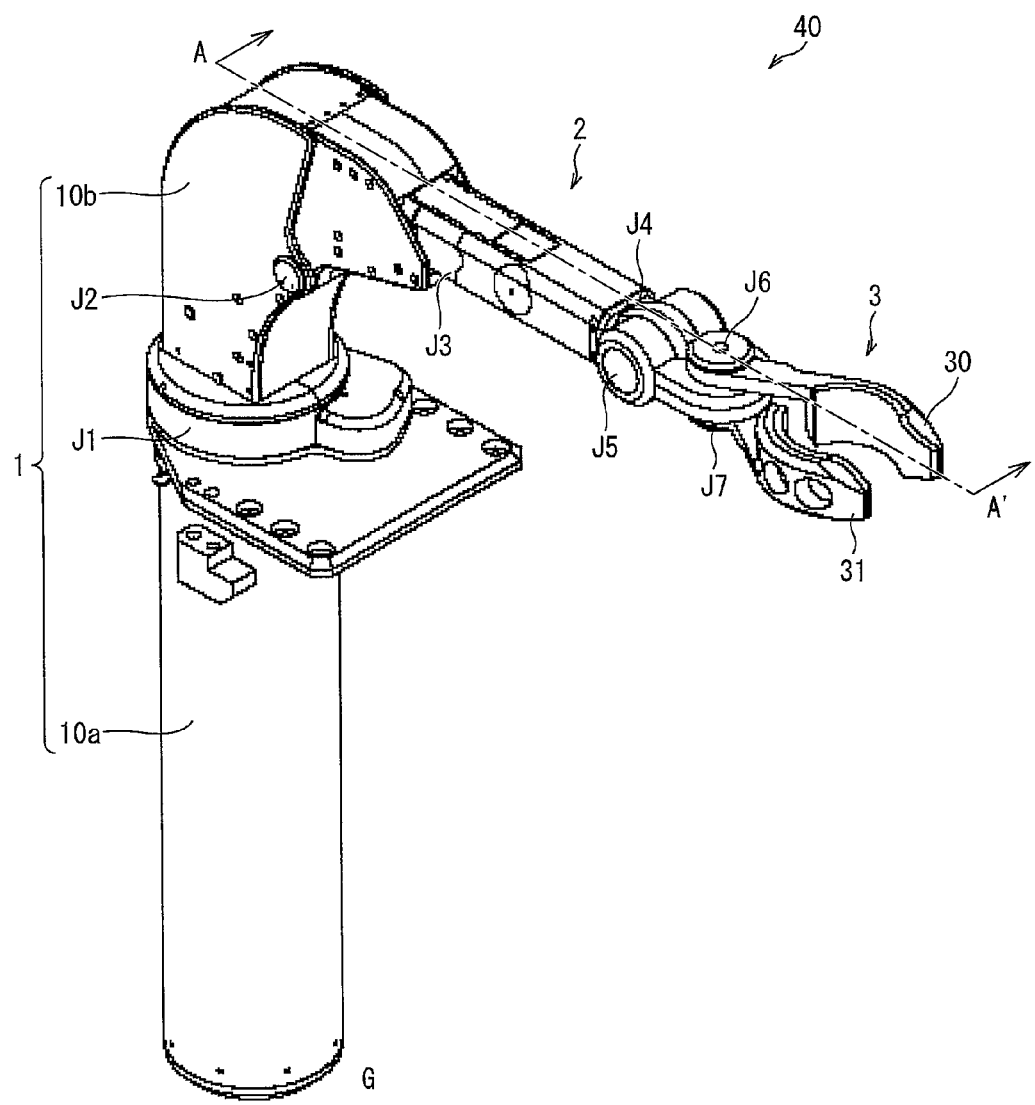
FIG. 1 is a perspective view illustrating a robot arm according to one embodiment of the present invention.
Figure 2:
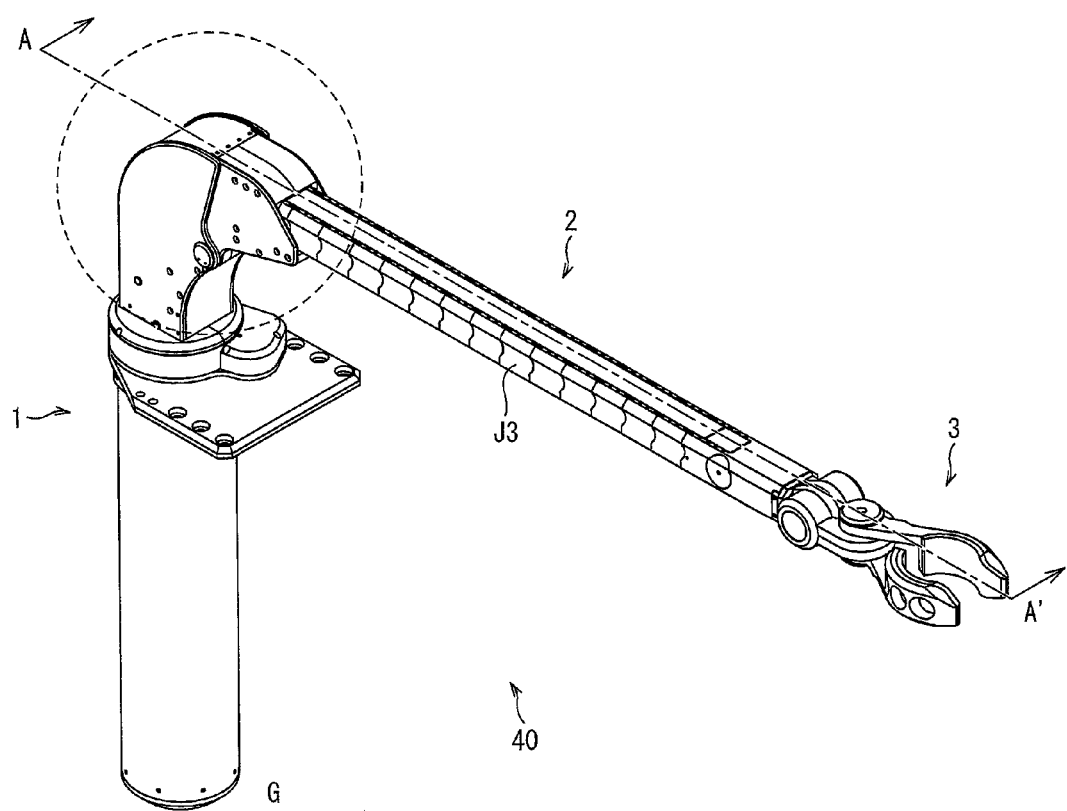
FIG. 2 is a side view illustrating the robot arm according to one embodiment of the present invention of which a linear-motion telescopic joint is elongated.

FIG. 1 and FIG. 2 are perspective views illustrating appearances of the robot arm. FIG. 1 illustrates an arm section 2 of a robot arm 40 in which the linear-motion telescopic joint J3 provided therein is contracted. FIG. 2 illustrates the arm section 2 in which the linear-motion telescopic joint J3 is elongated.

As illustrated in FIG. 1, the robot arm 40 includes a support member 1 (a basement), an arm section 2, and a hand section 3 (another structural member, a gripping section, an end effector).

[Support Member]

As illustrated in FIG. 1, the support member 1 is arranged to extend in a vertical direction from an installation surface G of the robot arm 40, thereby supporting the robot arm 40 entirely.

The support member 1 includes: two support sections, i.e., a first support section 10a and a second support section 10b; a first rotational joint J1; and a second rotational joint J2, as illustrated in FIG. 1.

The first support section 10a and the second support section 10b, each of which has a cylindrical shape, are provided so that one is placed above the other so as to align central axes (support axes) thereof. The first support section 10a and the second support section 10b have a hollow structure, and are arranged to house therein a part of a constituent members of the after-mentioned arm section 2.

[Arm Section]

Figure 3:
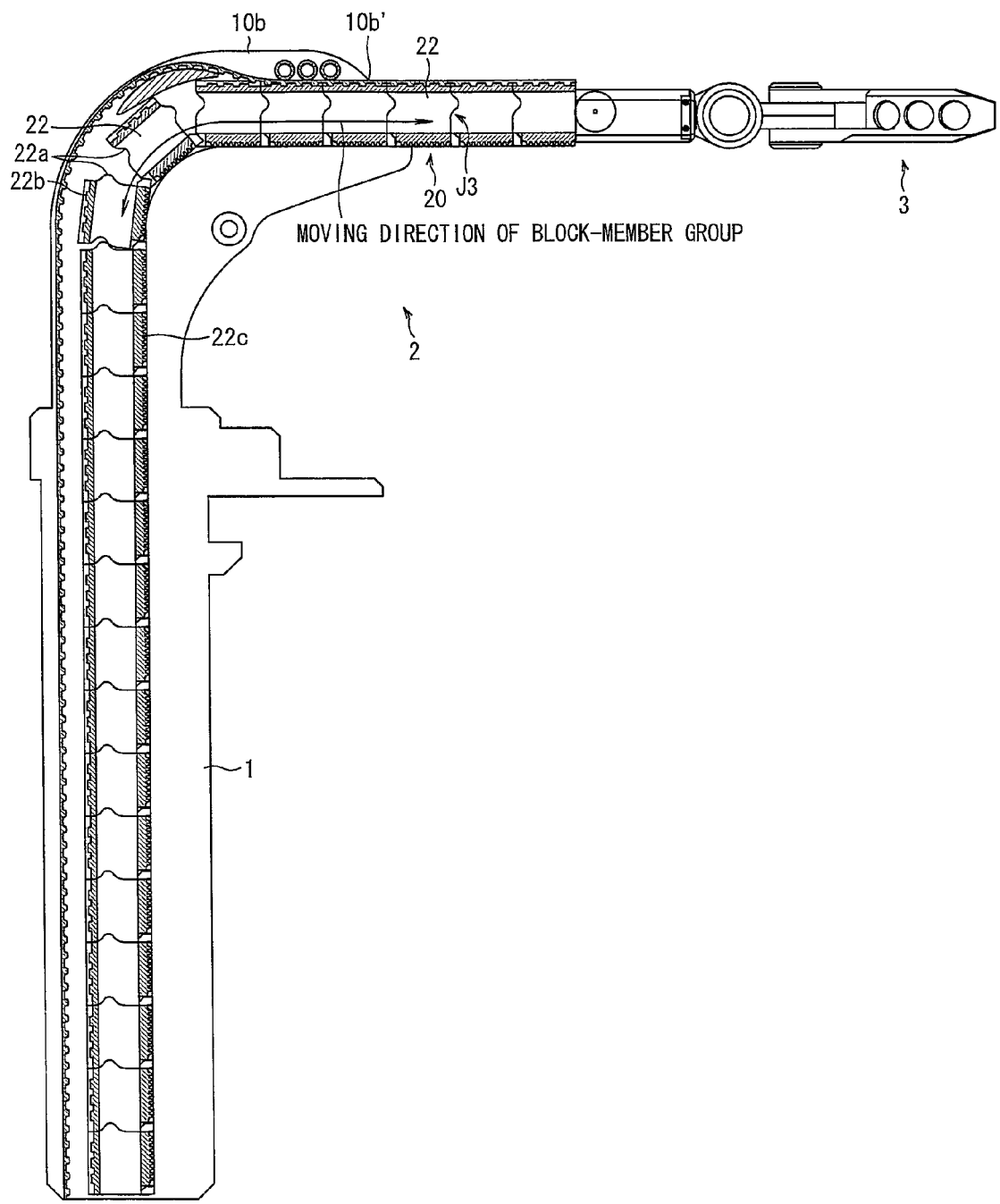
FIG. 3 is a cross-sectional view illustrating an arm section of the robot arm according to one embodiment of the present invention.

FIG. 3 is a cross-sectional view of the robot arm 40, taken along a line A-A' in FIG. 1.

Figure 4:
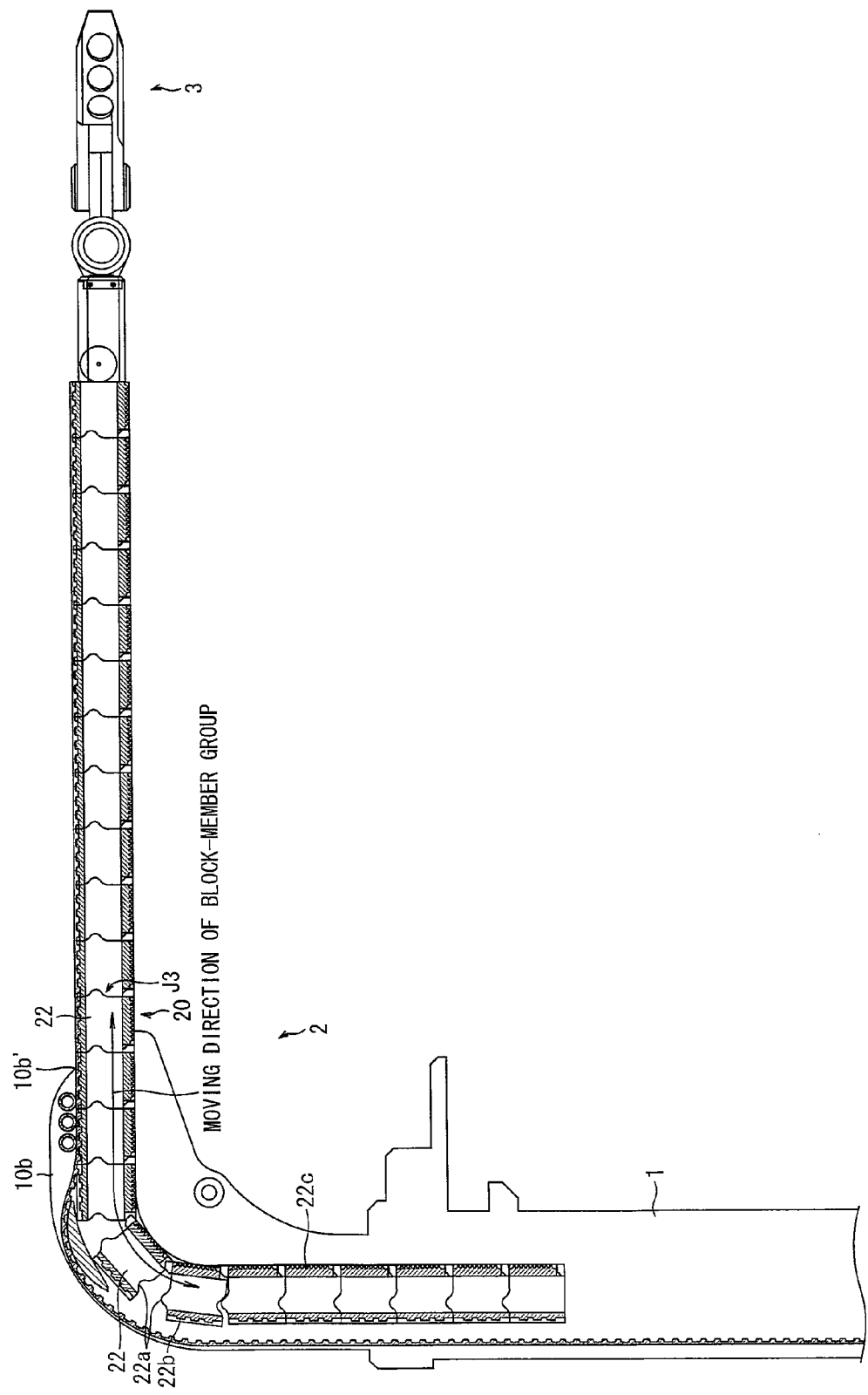
FIG. 4 is a cross-sectional view illustrating the arm section of the robot arm according to one embodiment of the present invention.

The arm section 2 includes the linear-motion telescopic joint J3 illustrated in FIG. 3, and is arranged to adjust the hand section 3 to an intended position and posture. The hand section 3 is provided at a front edge of the arm section 2. For example, when the linear-motion telescopic joint J3 in a contraction state illustrated in FIG. 3 is elongated, the hand section 3 can be moved to a position far away from the support member 1 as illustrated in FIG. 4. FIG. 4 is a cross-sectional view of the linear-motion telescopic joint J3 of FIG. 2, the linear-motion telescopic joint J3 being elongated.

The arm section 2 includes, as main constituent members, a block-member group 20 constituting the linear-motion telescopic joint J3 (see FIG. 3), and moving means (driving mechanism) 21 (see FIG. 6) which drives the linear-motion telescopic joint J3.

As illustrated in FIG. 3 and FIG. 4, the block-member group 20 is constituted by a plurality of block members 22, and all the plurality of block members 22 are serially aligned from a headmost block member 22 at one end to a last block member 22 at the other end.

Figure 5:
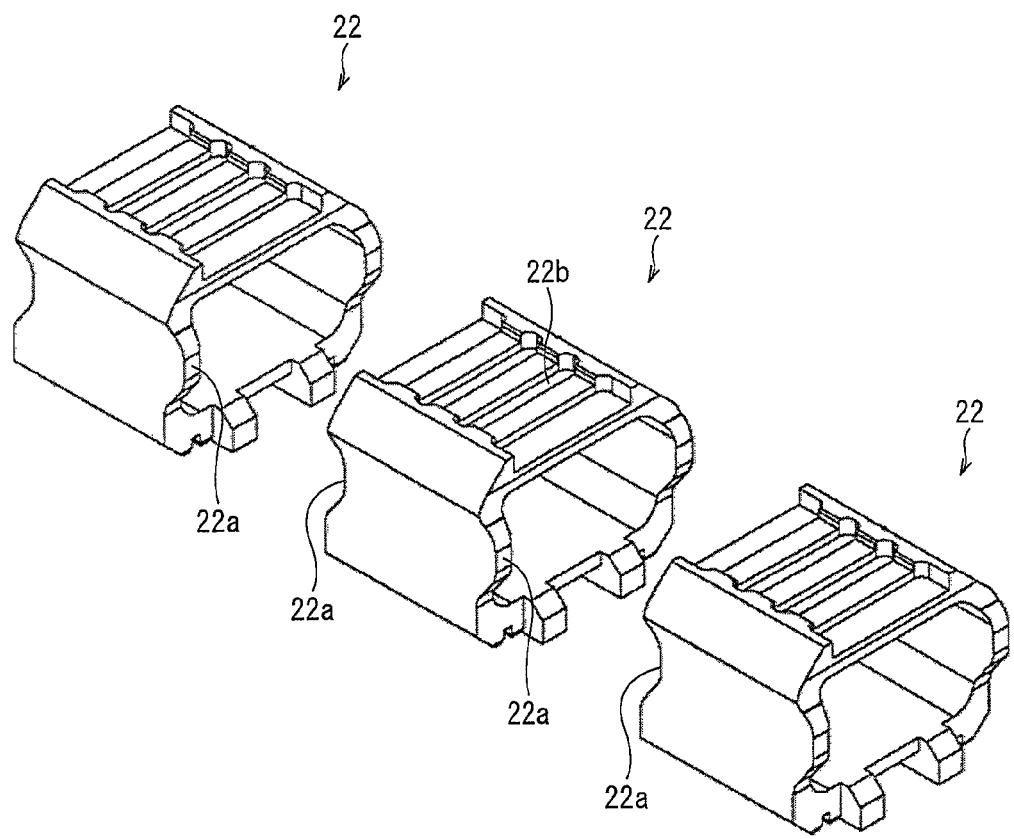
FIG. 5 is a perspective view illustrating block members provided in the robot arm according to one embodiment of the present invention.

The following deals with how each of the block members 22 is configured, with reference to FIG. 5. FIG. 5 is a perspective view illustrating an appearance of each of the block members 22. As illustrated in FIG. 5, the block member has a hollow structure that passes through in a connecting direction along which the plurality of block members 22 are connected to one another. The internal hollow space of the block member 22 is configured to serve as a space suitable for passing electric wires therethrough while protecting them. The block member 22 has side-undulating structures 22a on its side surfaces (at positions facing adjacent block members 22). Each of the side-undulating structures 22a of the block member 22 meshes with a corresponding side-undulating structure 22a of its adjacent block member 22. This arrangement makes it possible to prevent that adjacent block members 22 are off to the side at their connected portion (i.e., displaced in a vertical direction to the connecting direction) (see FIG. 3 and FIG. 4). Further, as illustrated in FIG. 5, each of the block members 22 has an upper-surface corrugated structure 22b on its upper surface. The upper-surface corrugated structure 22b is configured to mesh with the after-mentioned toothed belt.

Figure 6:
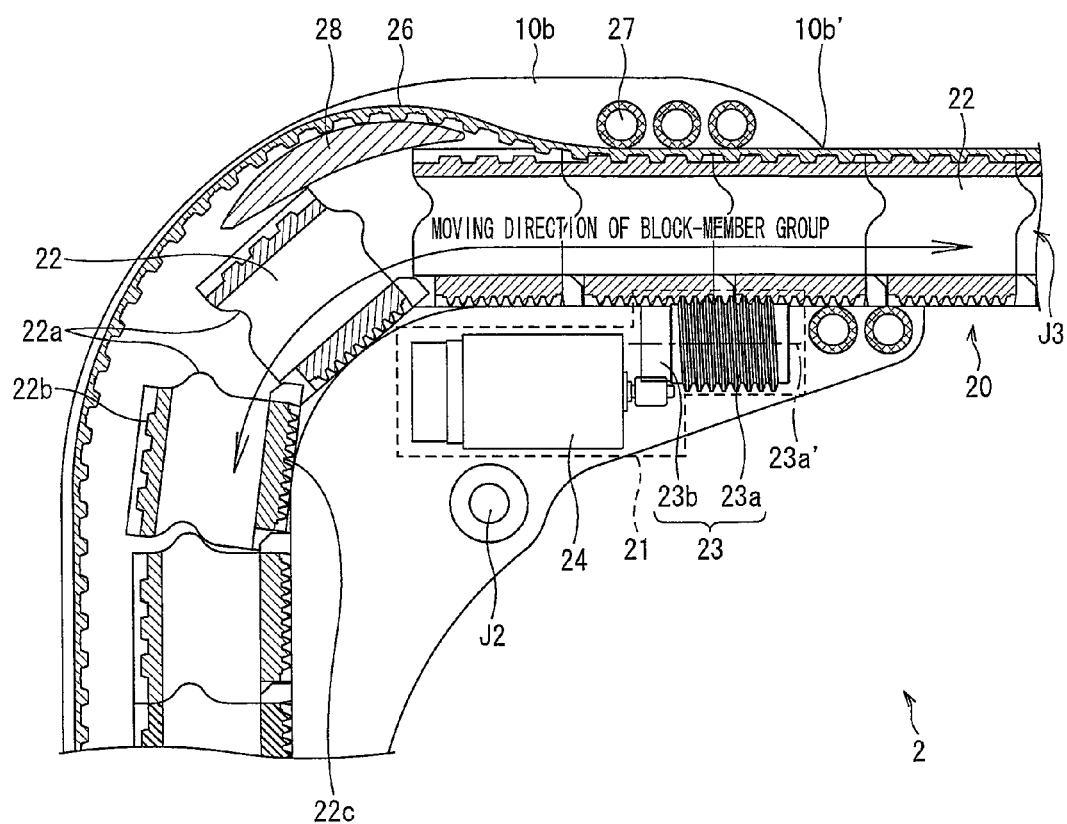
FIG. 6 is a cross-sectional view taken along sagittal plane, illustrating the arm section of the robot arm according to one embodiment of the present invention.
Figure 7:
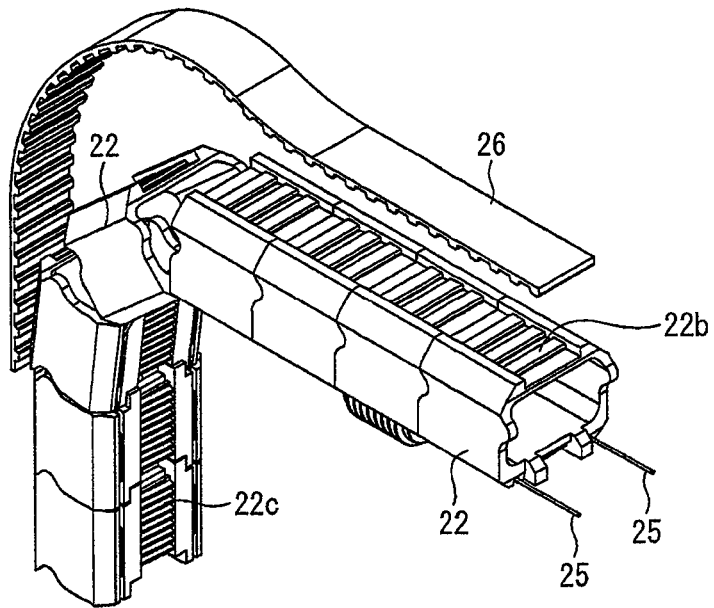
FIG. 7 is a perspective view illustrating the arm section of the robot arm according to one embodiment of the present invention.
Figure 7:
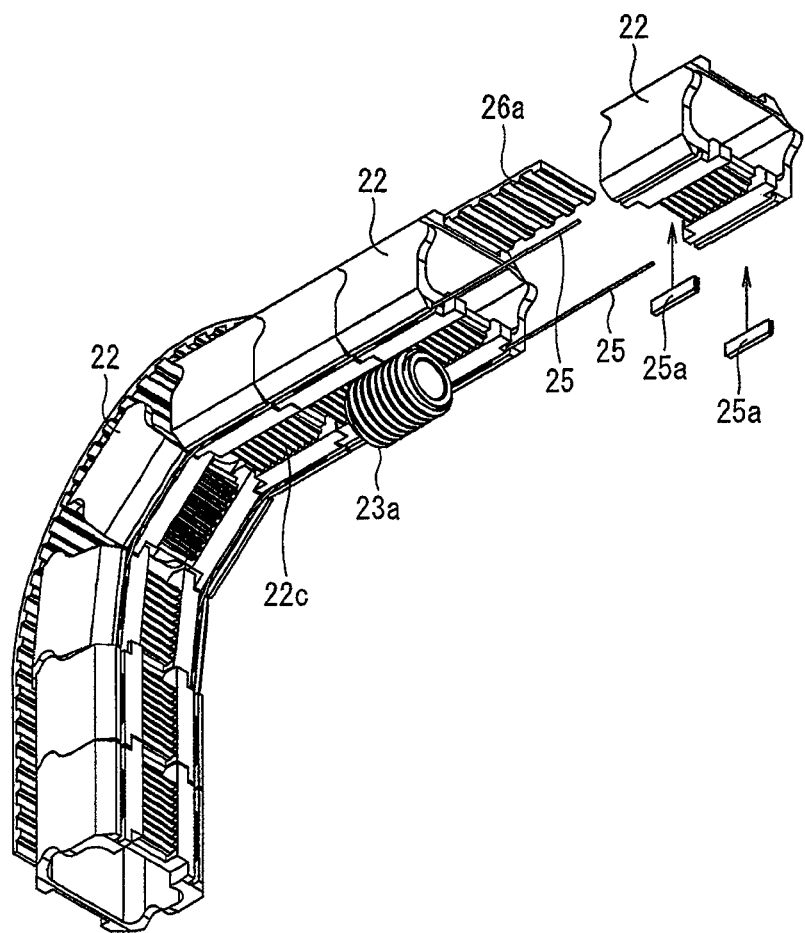

Further, each of the block members 22 has a bottom-surface corrugated structure 22c as a rack gear on its bottom surface, as illustrated in FIG. 6 and FIG. 7.

The block members configured as such are serially aligned so as to construct the block-member group 20. A part of the block-member group 20 forms a rigid alignment by fixing the block members to each other. Most of the rigid part is projected outward from an opening portion 10b' of the second support section 10b in a uniaxial direction. On the other hand, that remaining part of the block-member group 20 which forms an unfixed alignment is housed inside the second support section 10b (the support member 1). In the subsequent explanation, a region of the block-member group that forms the rigid alignment may be sometimes referred to as "rigid zone", while an unfixed region of the block-member group may be sometimes referred to as "flexible zone". Further, in the rigid zone, the length of a projecting part of the block-member group that projects from the opening portion 10b' may be sometimes referred to as "arm length".

FIG. 6 is a partial cross-sectional view enlarging a cross section of a region surrounded by a dotted line in FIG. 2.

As illustrated in FIG. 6, the moving means 21 fixes a given block member 22 to another block member 22 so that they are aligned in a uniaxial direction to form a rigid alignment, and elongates the rigid alignment outwardly from the opening portion 10b'. In the meantime, the moving means 21 draws the outwardly elongated rigid alignment of the block-member group 20 back into the second support section 10b, and unfixes the block members 22 one by one from the rigid alignment of the block-member group 20, thereby shortening the rigid zone. Thus, the length of the rigid zone, i.e., the arm length can be varied. In other words, the moving means 21 can carry out telescopic motion of the linear-motion telescopic joint J3. The following describes the telescopic mechanism more specifically.

As illustrated in FIG. 6, the moving means 21 includes: a worm-gear speed reducer 23 having a worm gear 23a that is configured to mesh with a bottom-surface corrugated structure 22c as a rack gear of each block member 22; and a motor 24 for driving the worm gear 23a. A spur gear 23b illustrated in FIG. 6 is configured to rotate the worm gear 23a by rather increasing torque of the motor 24. With the use of the worm-gear speed reducer 23, it is possible to attain large speed reduction ratio with quite a few number of gears as compared with a general speed reducer only using spur gears. Accordingly, this arrangement makes it possible to realize a very compact speed reducer.

A thrust generating direction of the worm gear 23a is the same as a direction of a rotational axis 23a' of the worm gear 23, as illustrated in FIG. 6. On this account, the worm gear 23a is arranged so that the rotational axis 23a' is oriented along a rigid direction (projecting direction) of the block-member group 20. This arrangement can establish a mechanism in which when the bottom-surface corrugated structure 22c as a rack gear of a given block member 22 meshes with the worm gear 23a, the given block member 22 moves along the thrust generating direction of the worm gear 23a. Further, a rotational axis of the motor 24 is also oriented along the rigid direction of the block-member group 20. This easily allows for compact storage of a large driving motor without causing the driving motor to bulge from a side surface of the arm.

A thrust of the worm gear 23a is exerted on block members 22 so that the block members 22 are fixed to each other in the second support section 10b. The fixed block members 22 (the block-member group 20) are pushed from behind by a subsequent block member 22 so that the fixed block members 22 are pushed outwardly from the opening portion 10b'. Thus, the linear-motion telescopic joint J3 is elongated. On the other hand, when the worm gear 23a rotates reversely, the rigid block-member group is pulled back into the second support section 10b, and the block members 22 are unfixed one by one in the order from one to be housed first in the first support section 10a. Thus, the linear-motion telescopic joint J3 can be contracted. Block members 22 that are unfixed from the rigid zone are still connected serially but in a flexible manner (flexible zone). In the present embodiment, as illustrated in FIG. 3 and FIG. 4, the block-member group in the flexible zone is housed in a cascade manner along a central axis of the support member 1. This is the telescopic mechanism of the linear-motion telescopic joint J3.

(a) and (b) of FIG. 7 are perspective view illustrating some constituent members of a part of the arm section 2 corresponding to the part illustrated in FIG. 6, from different angles. As illustrated in (a) and (b) of FIG. 7, beside the above arrangement, the arm section 2 includes: two long ropes 25 that movably connect all the block members 22 in series; and a toothed belt 26 that meshes with upper-surface corrugated structures 22b of block members 22 fixed to each other in a rigid manner in the block-member group 20.

The ropes 25 are strained under the block-member group so as to cause a slight tensile force in a state where the block members 22 are fixed and aligned in a uniaxial direction, so that the block members 22 in the rigid zone do not have plays (loose) in connections between them. The ropes 25 are fixed to individual block members 22 by use of clasps 25a, as illustrated in (b) of FIG. 7.

The toothed belt 26 has a corrugated surface 26a so as to mesh with the upper-surface corrugated structure 22b of each of the block members 22. This allows the toothed belt 26 to mesh with corrugated structures of adjacent block members 22, thereby fixing the adjacent block member 22 to each other. In order to make the block-member group 20 into the flexible state (in order to unfix the block members 22), the toothed belt 26 thus meshing with the block-member group in the rigid state is removed therefrom. Even if any external force is applied to the rigid block-member group, a force affected on the toothed belt 26 is only a tensile force working on along a longitudinal direction. Therefore, the toothed belt 26 could not be released in midstream.

In addition, the toothed belt 26 can be attached to or removed from the block-member group 20 only at an end of the rigid zone. The attachment or removal of the toothed belt 26 can be performed very easily. For example, an upper guide roller 27 used for the attachment and a scraper 28 used for the removal are provided as illustrated in FIG. 6. Herewith, the attachment or removal can be performed by sliding the block-member group 20 in the connecting direction.

The toothed belt 26 is preferably a ready-made toothed belt (timing belt, synchronous belt) because the ready-made toothed belt has a high strength to resist high tension, its pitch between teeth is precise, and it is available at a low price.

[Hand Section]

Figure 8:
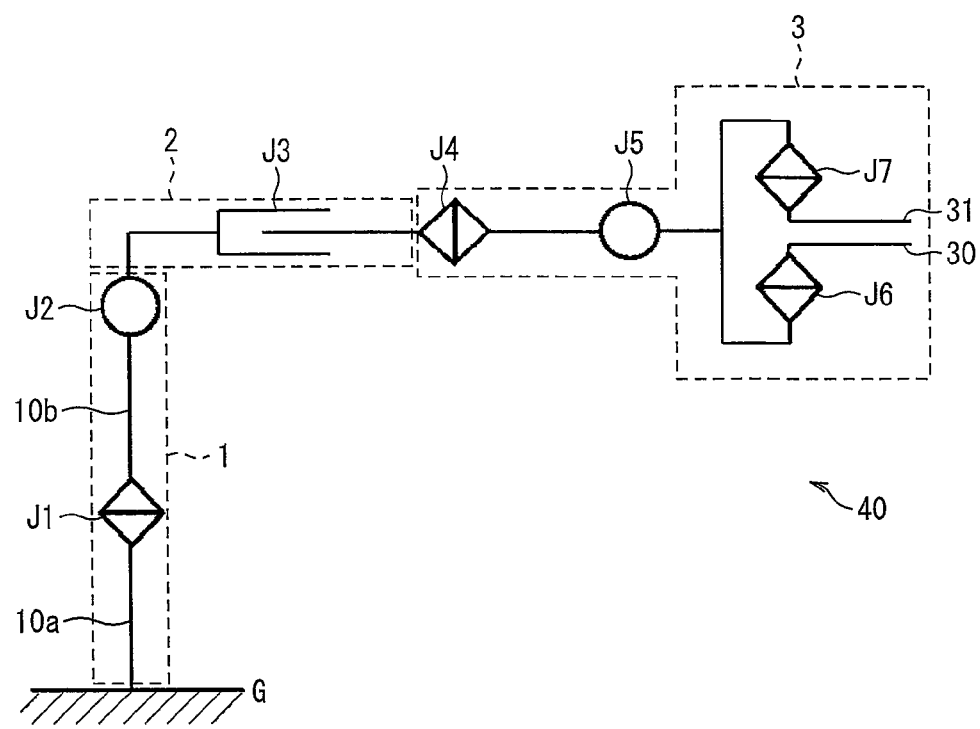
FIG. 8 illustrates an arrangement of degree of freedom of the robot arm according to one embodiment of the present invention.

The hand section 3 is provided at a front edge of the arm section 2. As illustrated in FIG. 8, the hand section 3 includes: a fourth rotational joint J4; a fifth rotational joint J5; a sixth rotational joint J6; a seventh rotational joint J7; a first finger 30; and a second finger 31.

With the use of the robot arm 40, according to the present embodiment, having the aforementioned arrangement, it is possible to carry out telescopic motion of an arm of the arm section without using any bending joint. This makes it possible to avoid such a problem that an object around the arm section is caught between sections of the robot arm when a bending joint provided in a middle of the arm section rotates. That is very significant for an assistive robot arm that works as a hand to help people to do their work in daily life. Further, the telescopic motion of the arm is performed only as linear telescopic motion. In view of this, especially, in a case where the robot arm according to the present embodiment is installed, as an assistive robot arm, at a wheel chair or at a side of a bed, a range of user's view is least blocked by the robot arm, as compared with an arrangement in which an arm section is equipped with bending joints in the middle of it. Accordingly, the user feels less uncomfortable in terms of his/her eyesight.

In the present embodiment, the support member 1 extends from an installation surface G in FIG. 8 in vertical direction. However, the present invention is not limited to this arrangement as long as the support member 1 may have a predetermined angle.

Further, in the present embodiment, the ropes 25 are used for serially connecting the block member 22. However, the ropes 25 are supplementary members, and hinges or the like for coupling adjacent block members may be used instead of the ropes 25. Further, in the present embodiment, the toothed belt 26 is used. However, similarly to the ropes 25, the toothed belt 26 is also a supplementary member, and therefore the rigid zone can be formed without the toothed belt 26. Such an arrangement will be shown in the following Modified Example (2), for example.

Further, in the present embodiment, a two-finger hand 32 is used as the hand section 3. However, the present invention is not limited to this arrangement, and a hand including three or more finger portions may be used. Furthermore, how to arrange the finger portions is not limited in any particular manner. Any types of structures desired to be arranged at an intended position or in an intended posture can be attached to a front edge of the arm section, instead of the hand section 3. For example, an apparatus having an image-capture device can be used as the hand section 3.

The arrangement of the present embodiment that has been described above is merely an example of the invention. That is, the present invention is not limited to the description of the embodiments above, but may be altered by a skilled person within the scope of the claims. An embodiment based on a proper combination of technical means disclosed in different embodiments is encompassed in the technical scope of the present invention. For example, the arrangements of the following modified examples may be also applicable to the present invention.

Modified Example (1)

Figure 9:
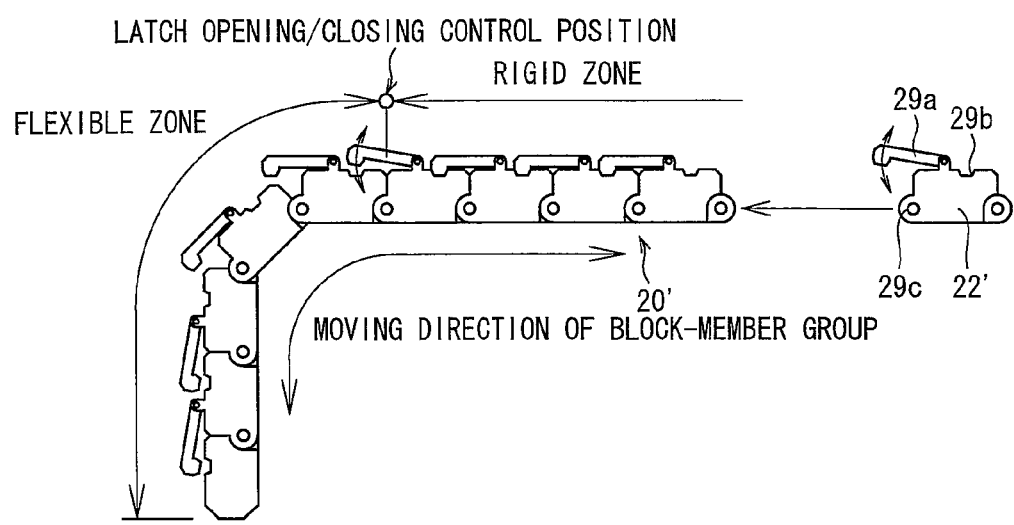
FIG. 9 is a side view illustrating a modified example of a block-member group of the robot arm according to one embodiment of the present invention.

FIG. 9 is a side view illustrating a modified example of the block-member group. FIG. 9 illustrates a block-member group 20' according to the present modified example, viewed from the same viewing angle as in FIG. 6 illustrating the block-member group 20. As illustrated in FIG. 9, each block member 22' in the block-member group 20' has an interblock fixing latch mechanism 29a and a recessed portion 29b configured to engage with an end of an interblock fixing latch mechanism 29a of its adjacent block member 22'.

Further, the block-member group 20 in FIG. 7 uses the ropes 25 for serially connecting the block members 22. On the other hand, in the block-member group 20' of the modified example, each block member 22' has an interblock movable coupling mechanism 29c for movably coupling the block member 22' with its adjacent block member 22'. This allows the block members 22' to be serially connected with each other via the interblock movable coupling mechanisms 29c.

Thus, the block members 22' are serially aligned. The block members 22' thus serially aligned form a rigid serial alignment when their interblock fixing latch mechanisms 29a engage with corresponding recessed portions 29b, respectively (see the rigid zone in FIG. 9). On the other hand, in a zone where the interblock fixing latch mechanisms 29a does not engage with corresponding recessed portions 29b, although the block members 22' are connected with each other via the interblock movable coupling mechanism 29c, they are not rigid but flexible (the flexible zone in FIG. 9).

In the present modified example, since the opening-closing control algorithm of the latch is simple as described above, the opening-closing control mechanism of the latch is also simple. In view of this, the arrangement is promising in terms of quick and smooth telescopic motion of the arm.

Figure 10:
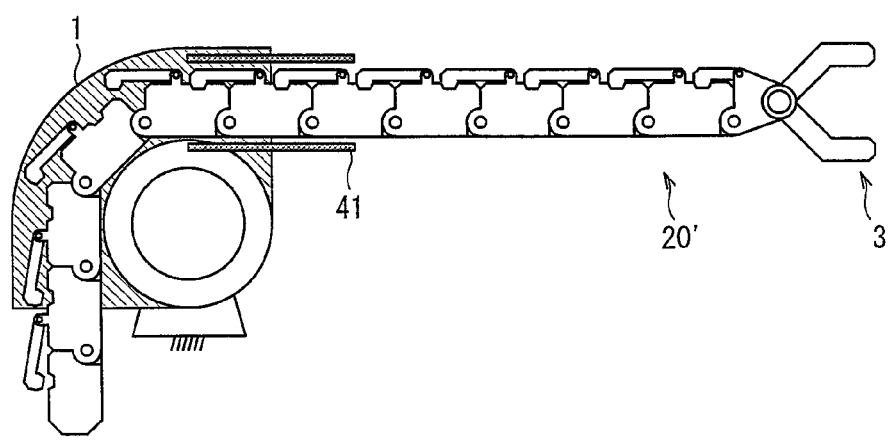
FIG. 10 is a side view illustrating a modified example of the arm section of the robot arm according to one embodiment of the present invention.

Further, an arrangement in which the block-member group 20' is connected to a support member 1 is illustrated in FIG. 10. In the arrangement illustrated in FIG. 10, the block-member group 20' is arranged such that a projection direction of the rigid zone is defined by a guide mechanism 41.

Figure 11:
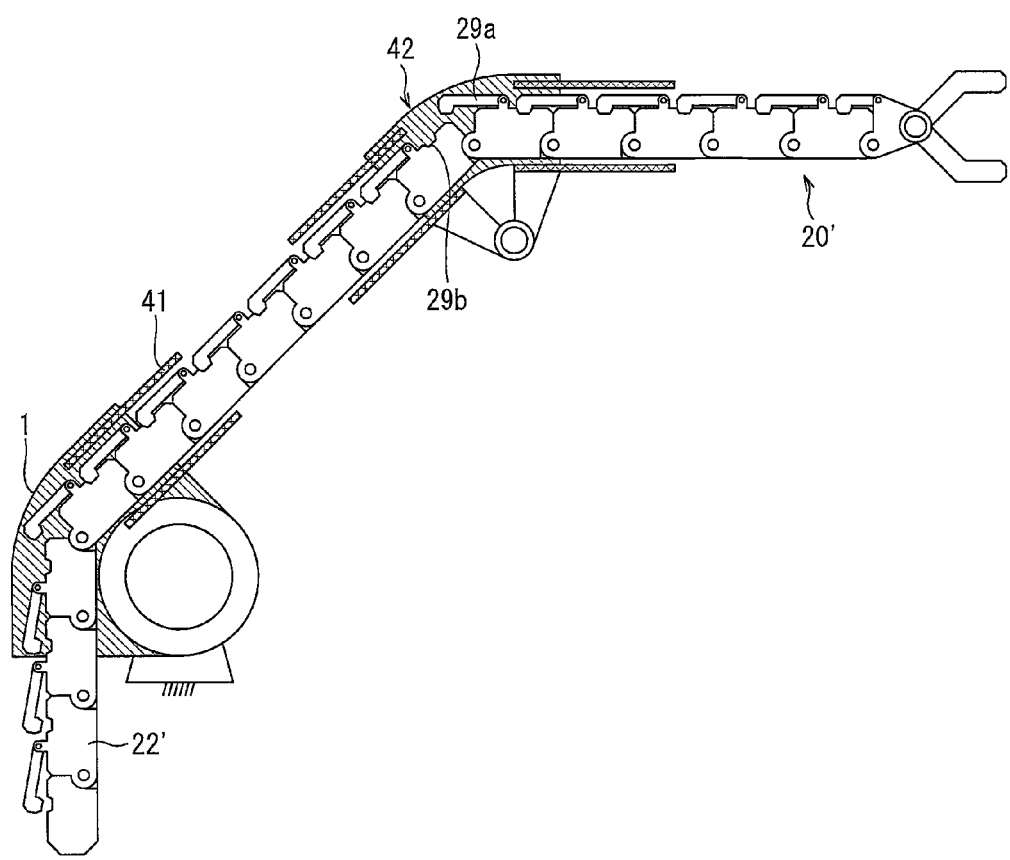
FIG. 11 is a side view illustrating a modified example of the arm section of the robot arm according to one embodiment of the present invention.

Further, it is also possible to add another guide mechanism, as illustrated in FIG. 11. In FIG. 11, an additional guide mechanism 42 is provided. The additional guide mechanism 42 is arranged such that an inside pathway through which the block-member group passes is bended, and regions at both sides of the pathway regulate the block-member group 20' to a uniaxial direction. The block-member group 20' may be arranged as follows: (i) adjacent block members 22' are rigidly aligned in line within a region between the support member 1 and an end of the additional guide mechanism 42; (ii) when the adjacent block members 22' come in the additional guide mechanism 42 (a central portion), an interblock fixing latch mechanism 29a of one of the adjacent block members 22' is disengaged from a recessed portion 29b of the other one of the adjacent block members 22' so that the adjacent block members 22' are connected in a flexible manner, whereby the block-member group 20' is bended along the bended shape of the additional guide mechanism 42; and (iii) when the adjacent block members 22' come in a region at the other end of the additional guide mechanism 42, which region is defined in a uniaxial direction, the disengaged interblock fixing latch mechanism 29a and recessed portion 29b are engaged with each other again, thereby allowing the adjacent block members 22' to be aligned in line in a rigid manner.

Figure 12:
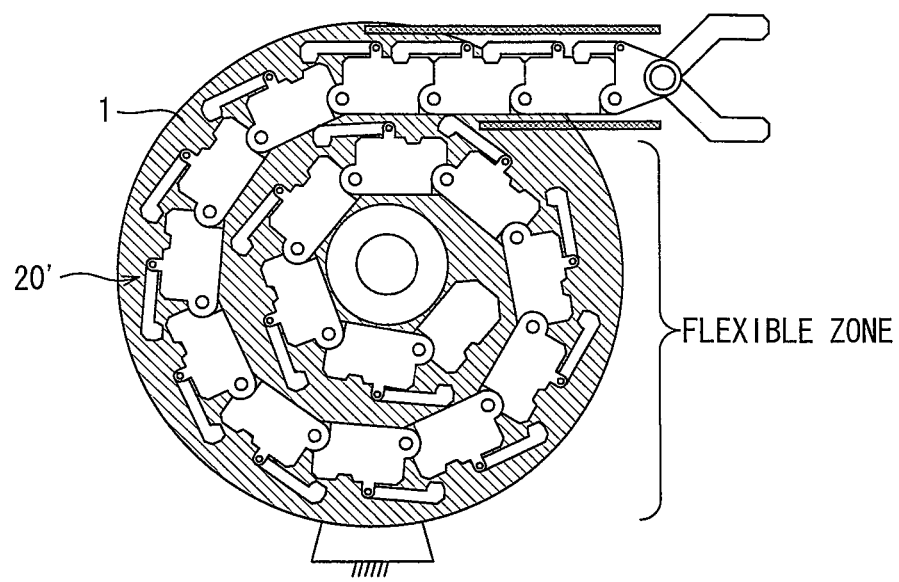
FIG. 12 is a side view illustrating a modified example of the arm section of the robot arm according to one embodiment of the present invention.

Further, FIG. 12 illustrates one example of how to house the block members 22' of the flexible zone. As illustrated in FIG. 12, the block members 22' of the flexible zone are housed inside the support member 1 in whorl. As such, how to house the block members is not limited to a vertical manner as described in the above embodiment. The block members 22' of the flexible zone can be housed in a desirable compact space.

Figure 13:
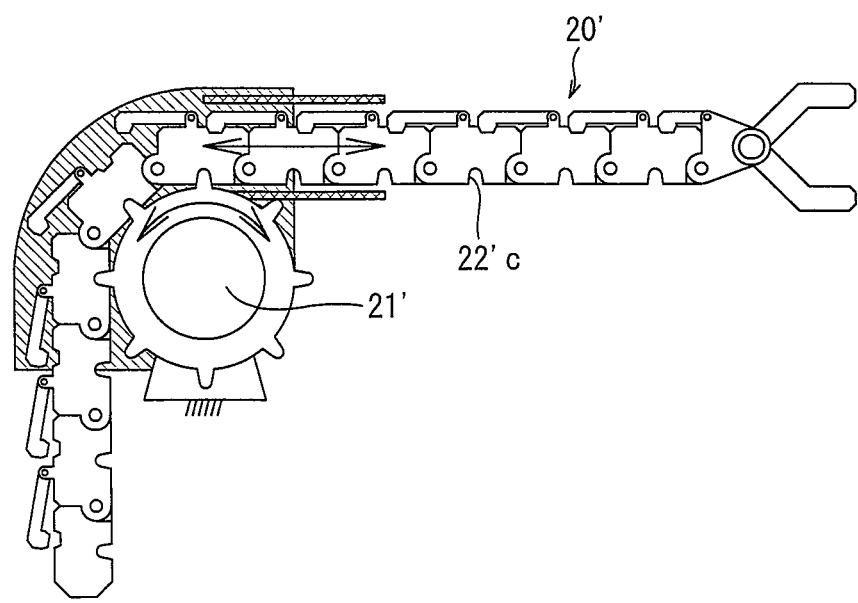
FIG. 13 illustrates a driving mechanism provided in the arm section of the robot arm according to one embodiment of the present invention.

Further, FIG. 13 illustrates a driving mechanism using recessed portions provided on bottom surfaces of the block members 22'. In the arrangement illustrated in FIG. 13, a driving gear 21 that engages with the recessed portions 22c' provided on the bottom surfaces of the block members 22' is provided. The block-member group 20' can be elongated or contracted by rotating the driving gear 21.

Modified Example (2)

Figure 14:
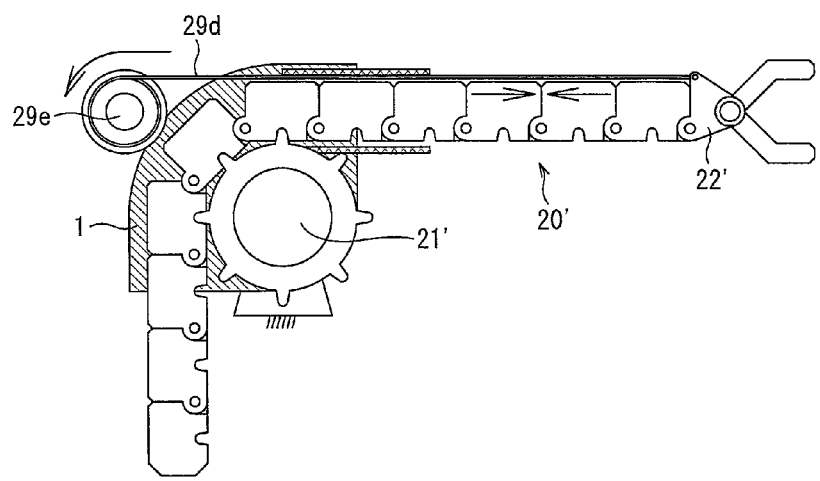
FIG. 14 is a side view illustrating another modified example of the arm section of the robot arm according to one embodiment of the present invention.

FIG. 14 illustrates another modified example. In the present modified example, there are provided a block-member group 20' of an arm section 2; a driving gear 21' that engages with recessed portions 22c' provided on bottom surfaces of block members 22' in the block-member group 20';

and a tensile rope 29d, which is strained from a top surface of a headmost block member 22', which is closest to a hand section 3, along top surfaces of the serially aligned block members 22' in the block-member group 20'. Further, in the arrangement, a rope winding drum 29e is provided so as to wind the tensile rope 29d. The rope winding drum 29e causes a tensile force exerted from the headmost block member 22' toward the rope winding drum 29e. On the other hand, an extrusion force exerted in a direction opposite to the tensile force is caused by the driving gear 21'. This causes the block members 22' serially aligned in the block-member group 20' to exert rigidification forces to each other in directions indicated by arrows in FIG. 14, thereby forming a rigid zone.

Figure 15:
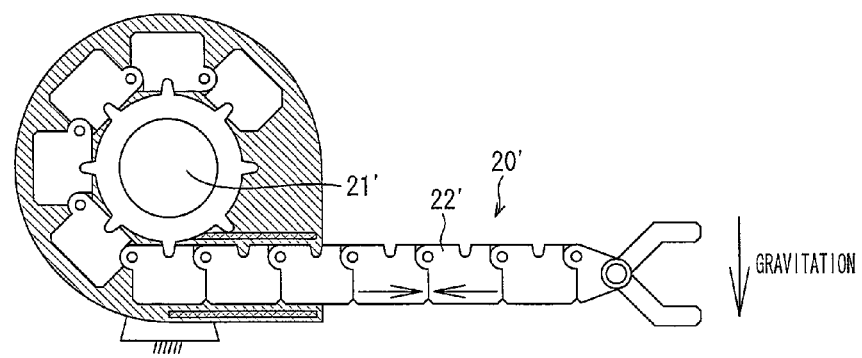
FIG. 15 is a side view illustrating another modified example of the arm section of the robot arm according to one embodiment of the present invention.

Further, FIG. 15 illustrates further another modified example, in which the rope winding drum 29e is not provided, and the block members 22' exert rigidification forces on each other in directions indicated by arrows in FIG. 15 by utilizing gravity of the block members 22', thereby forming a rigid zone.

Embodiment 2

A robot arm of the present invention includes: an installation section to be fixed on a desk, a floor, or the like; a support member connected to the installation section via a rotatable first rotational joint; a straight-link arm section connected to the support member via a second rotational joint, which is rotatable in a vertical direction to a rotational direction of the first rotational joint; and an end effector provided at an end of the arm section, and the arm section having a linear-motion telescopic mechanism, (i) which allows the arm section to be elongated or contracted to an arbitrary arm length and (ii) which is constituted by structural members provided in advance to achieve a maximum arm length, the linear-motion telescopic mechanism being arranged to separate, from the arm section, a part of the structural members that is beyond the arbitrary arm length and to house the part into a space deviating from a central axis of the arm section along an elongate direction of the arm section.

The following describes one embodiment of the robot arm according to the present invention with reference to FIG. 1 to FIG. 24. A structure of the robot arm has the same structure as that of the robot arm that has been already described in [Embodiment 1]. Accordingly, the present embodiment only deals with arrangements that have not been described in [Embodiment 1], in regard to the robot arm of the present embodiment, which has the aforementioned features.

As illustrated in FIG. 8, a robot arm 40 includes a first rotational joint J1, a second rotational joint J2, a third linear-motion telescopic joint J3, a fourth rotational joint J4, a fifth rotational joint J5, a sixth rotational joint J6, and a seventh rotational joint J7. That is, the robot arm 40 has seven degrees of freedom in total.

As illustrated in FIG. 8, the robot arm 40 includes a support member 1, an arm section 2, and a hand section 3 (gripping section). The arm section 2 has a third linear-motion telescopic joint J3 that constitutes an arm with an arbitrary arm length. A part of the arm that extends beyond the arbitrary arm length of the third linear-motion telescopic joint J3 is placed in an axial direction different from the central axis of the arm along its elongate direction. The elongation and contraction of the third linear-motion telescopic joint J3 is performed without using any bending joint link having a rotational axis along a vertical direction to the central axis of the arm provided in the arm section.

[Support Member]

As has been already described in Embodiment 1, the support member 1 includes two support sections, i.e., a support section 10a and a second support section 10b; a first rotational joint J1; and a second rotational joint J2.

Figure 17:
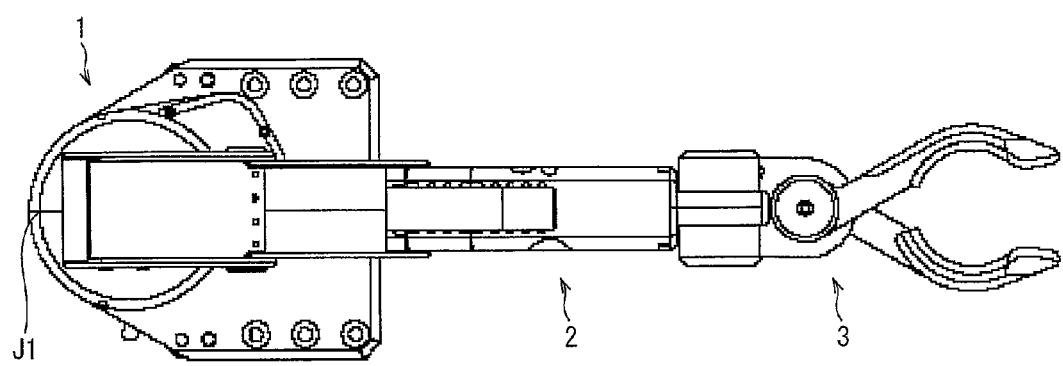
FIG. 17 is a top view illustrating the robot arm according to one embodiment of the present invention.
Figure 18:
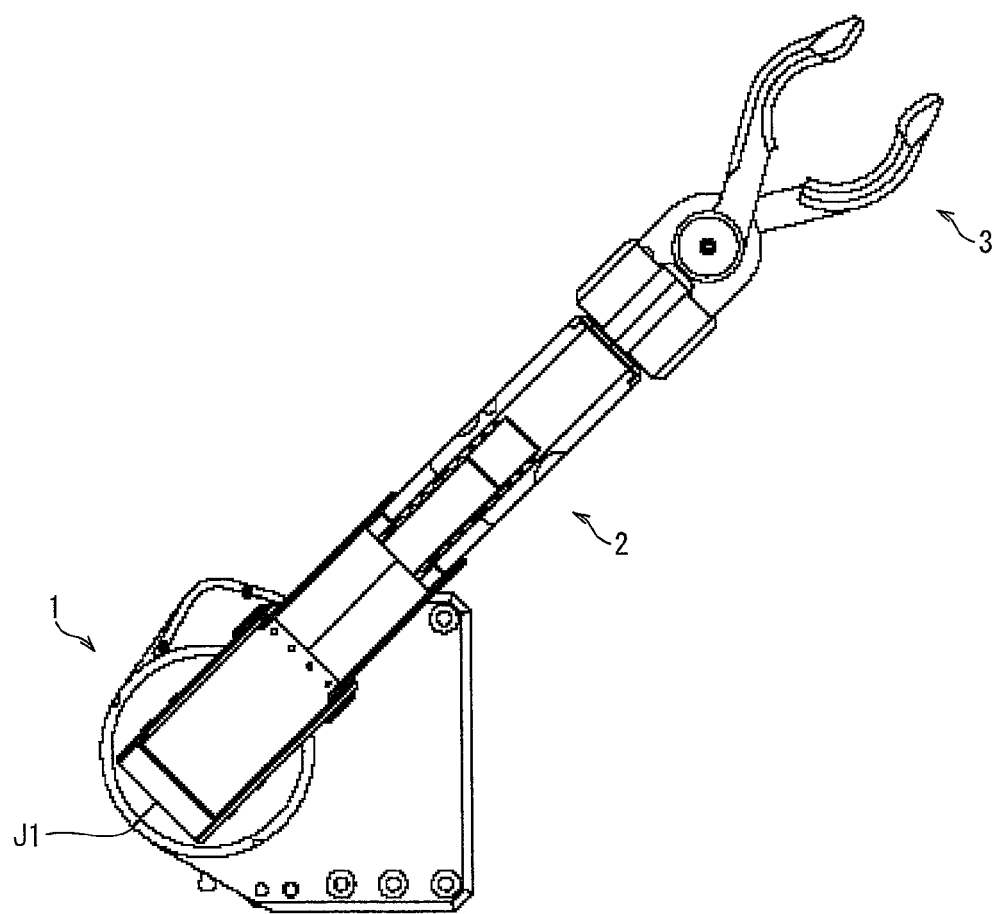
FIG. 18 is a top view illustrating the robot arm according to one embodiment of the present invention, the first rotational joint being rotated.

The first rotational joint J1 is provided between the first support section 10a and the second support section 10b, and serves as a torsional joint link having a rotational axis centering on the central axis of the support member 1 (a central axis of the first support section 10a and the second support section 10b). When the first rotational joint J1 rotates, the second support section 10b, the arm section 2, and the hand section 3 turn around the rotational axis, as illustrated in FIG. 17 and FIG. 18.

Figure 16:
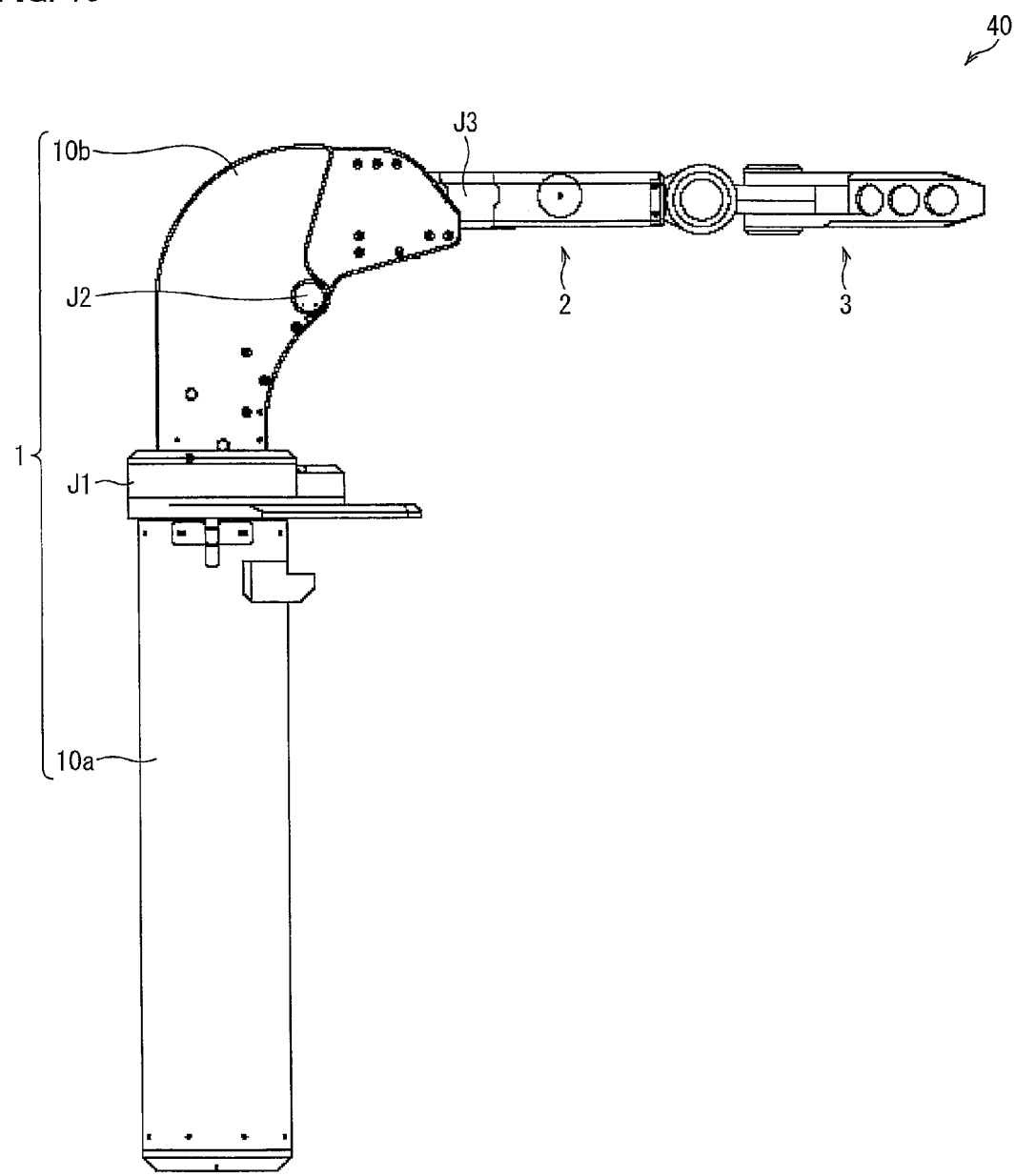
FIG. 16 is a side view illustrating the robot arm according to one embodiment of the present invention.
Figure 19:
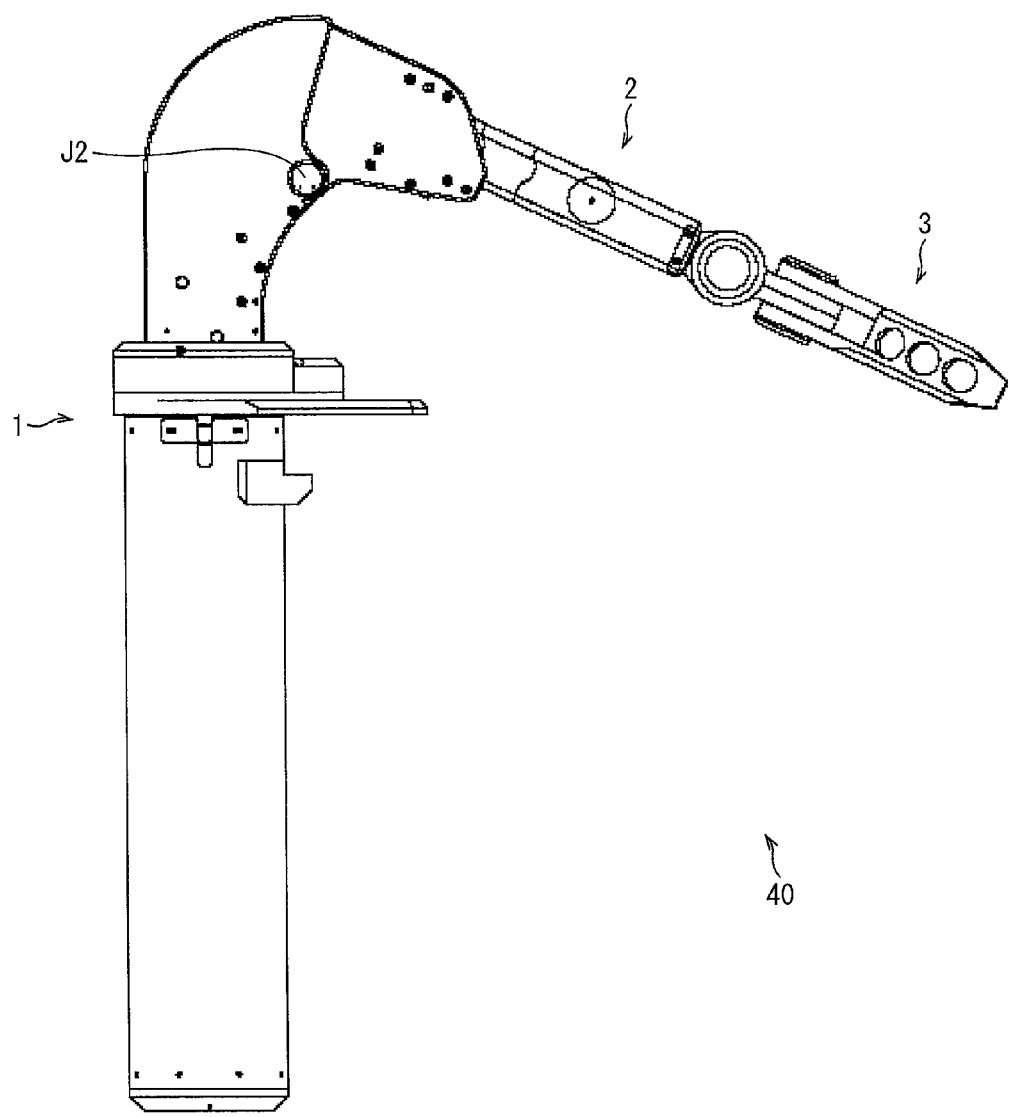
FIG. 19 is a side view illustrating the robot arm according to one embodiment of the present invention, the second rotational joint being rotated.

As illustrated in FIG. 1 and FIG. 8, the second rotational joint J2 is provided at an arm-section-side end of the second support section 10b, and serves as a bending joint having a rotational axis vertical to an axis of the support member 1. When the second rotational joint J2 rotates, the arm section 2 and the hand section 3 turn around a rotational axis of the second rotational joint J2 with respect to the support member 1, as illustrated in FIG. 16 and FIG. 19.

Further, the second rotational joint J2 is arranged to have an angle not to cause an object around the robot arm 40 to be tightly sandwiched between the support member 1 and the link section 2. More specifically, the second rotational joint J2 is controlled so that the angle between the support member 1 and the link section 2 is not less than 40°, preferably not less than 50°, more preferably not less than 60°. This arrangement makes it possible to significantly avoid the risk that an object gets caught between the support member 1 and the link section 2.

[Arm Section]

Details about the third linear-motion telescopic joint J3 provided in the arm section 2 have been already described in Embodiment 1, and therefore are not described here.

Figure 20:
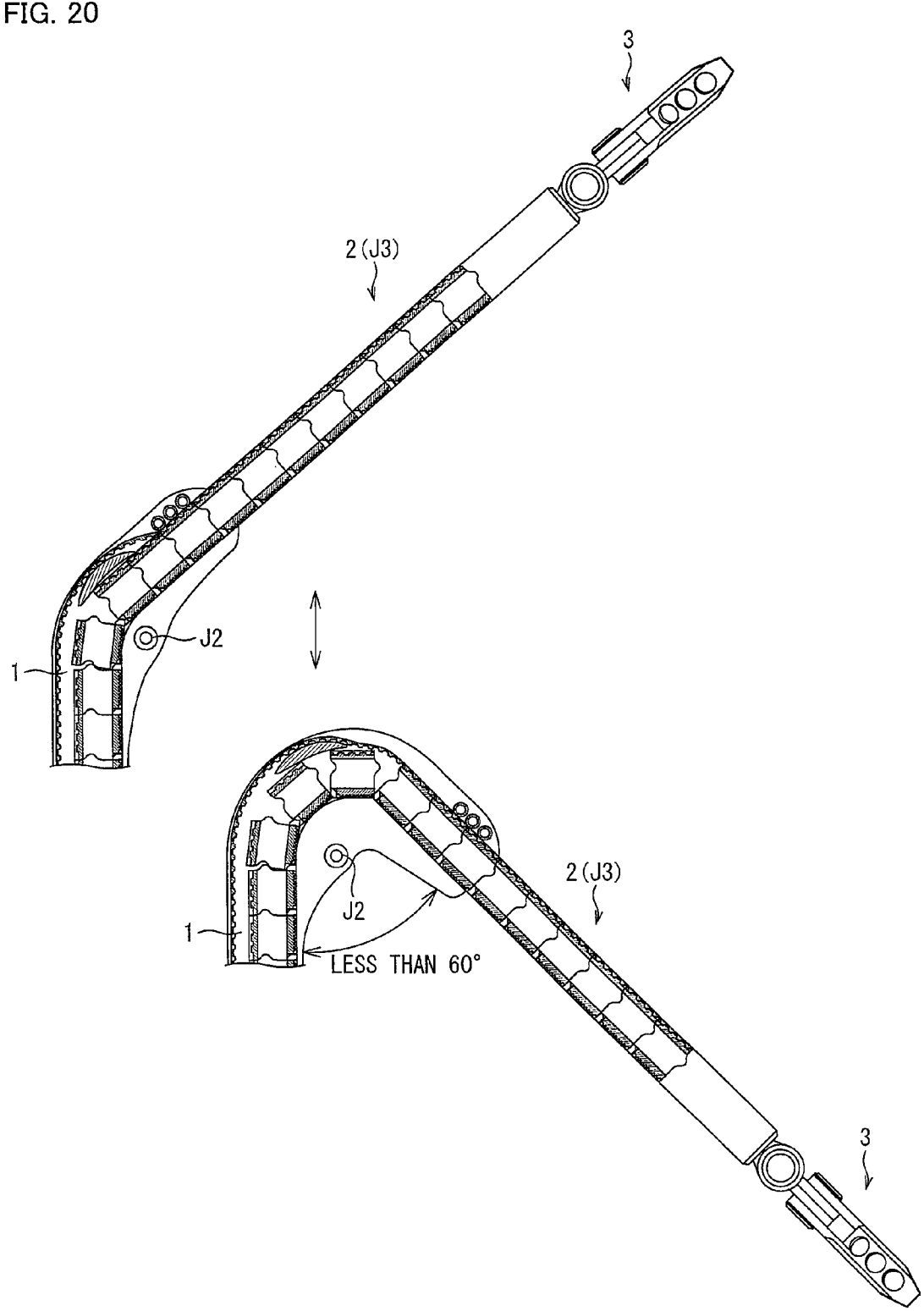
FIG. 20 is a cross-sectional view illustrating the arm section of the robot arm according to one embodiment of the present invention.

The arm section 2 can turn around with a central axis on the second rotational joint J2 while the third linear-motion telescopic joint J3 is projected in the axial direction outwardly from an opening portion 10b' provided in the second support section 10b. That is illustrated in FIG. 20.

[Hand Section]

As has been already describe above, the hand section 3 is provided at a front edge of the arm section 2. The hand section 3 includes, as illustrated in FIG. 8, a fourth rotational joint J4, a fifth rotational joint J5, a sixth rotational joint J6, a seventh rotational joint J7, a first finger 30, and a second finger 31.

Figure 21:
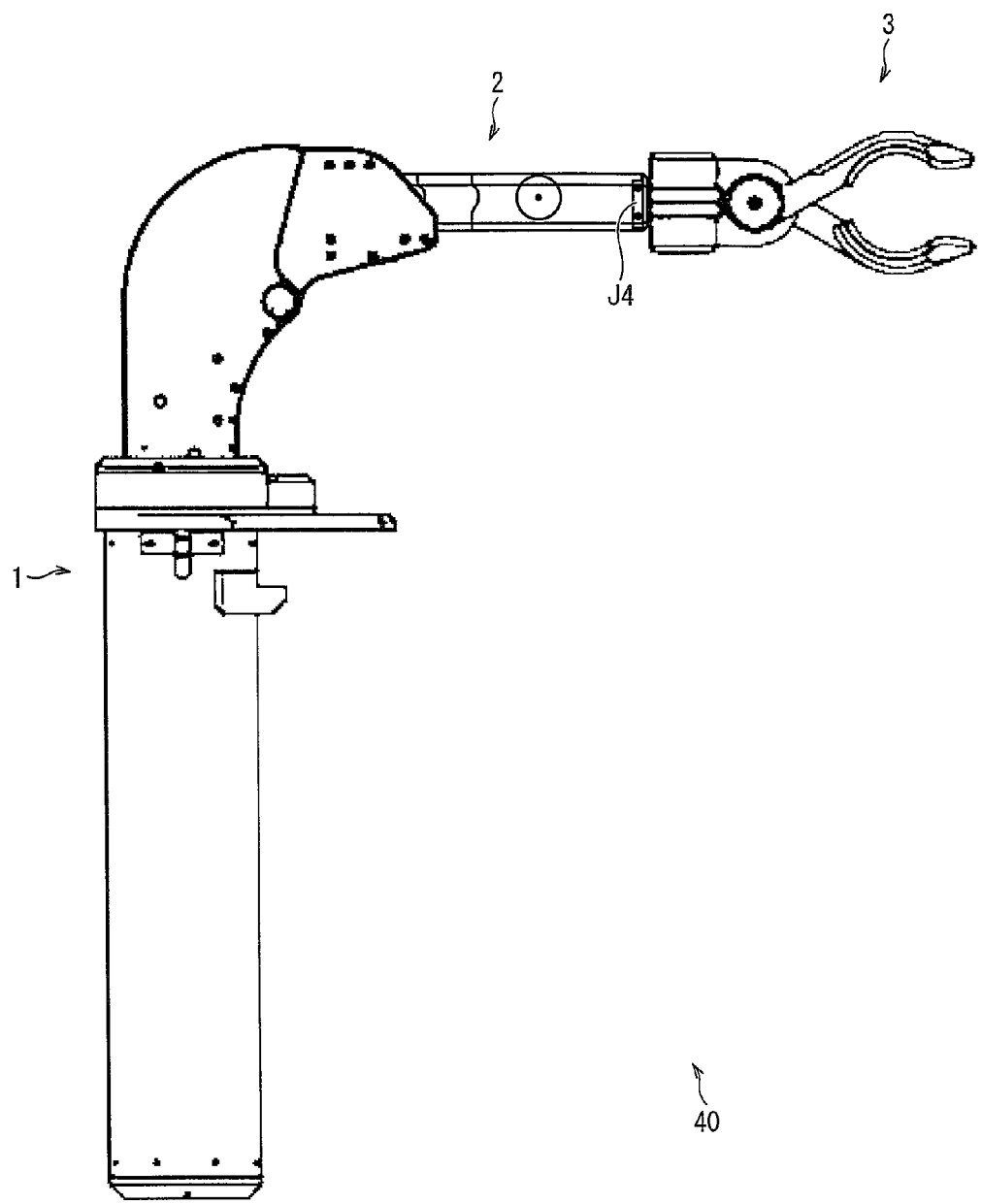
FIG. 21 is a side view illustrating the robot arm according to one embodiment of the present invention, the fourth rotational joint being rotated.

The fourth rotational joint J4 is a torsional joint link having a rotational axis centering on a central axis (hereinafter referred to as "arm axis") of the arm section 2 along its telescopic direction. When the fourth rotational joint J4 rotates, the hand section 3 from the fourth rotational joint J4 to the front edge of the hand section 3 turns around the rotational axis, as illustrated in FIG. 16 and FIG. 21.

Figure 22:
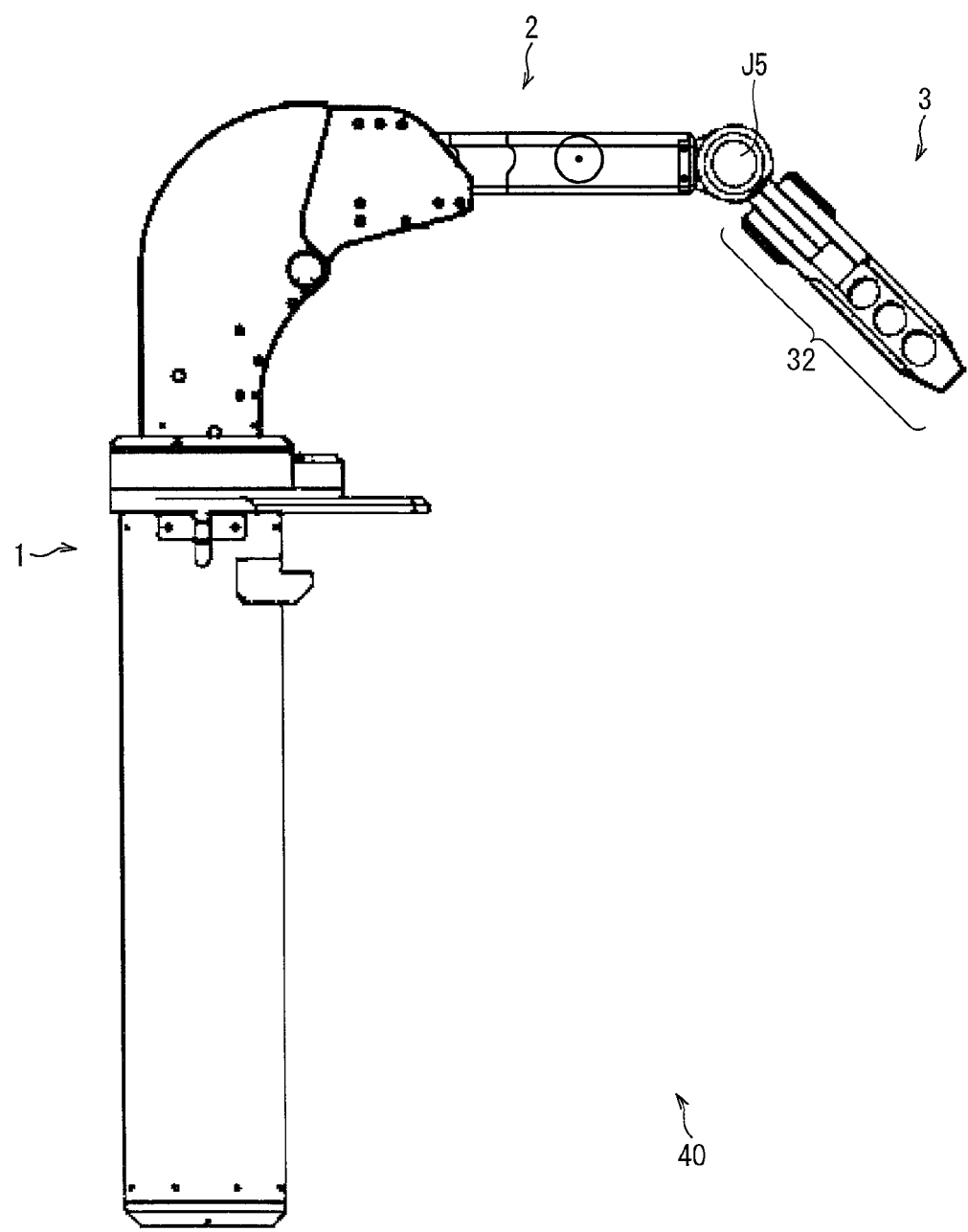
FIG. 22 is a side view illustrating the robot arm according to one embodiment of the present invention, the fifth rotational arm being rotated.

The fifth rotational joint J5 is a bending joint link having a rotational axis vertical to the arm axis. When the fifth rotational joint J5 rotates, a two-finger hand 32 from the fifth rotational joint J5 to a head of the two-finger hand 32 turns around the rotational axis, as illustrated in FIG. 22.

Figure 23:
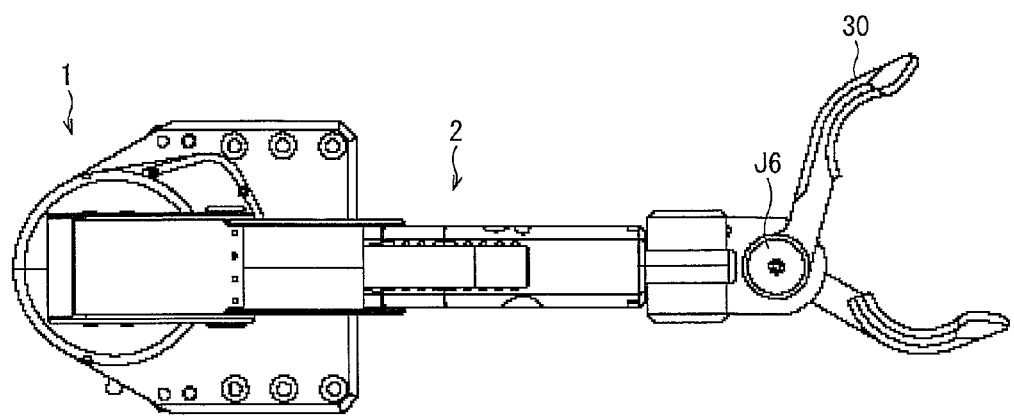
FIG. 23 is a top view illustrating the robot arm according to one embodiment of the present invention, the sixth rotational joint being rotated and the first finger 30 being operated.

The sixth rotational joint J6 is a bending joint link having a rotational axis vertical to both the arm axis and the fifth rotational joint J5. When the sixth rotational joint J6 rotates, the first finger 30 turns around the rotational axis, as illustrated in FIG. 23.

Figure 24:
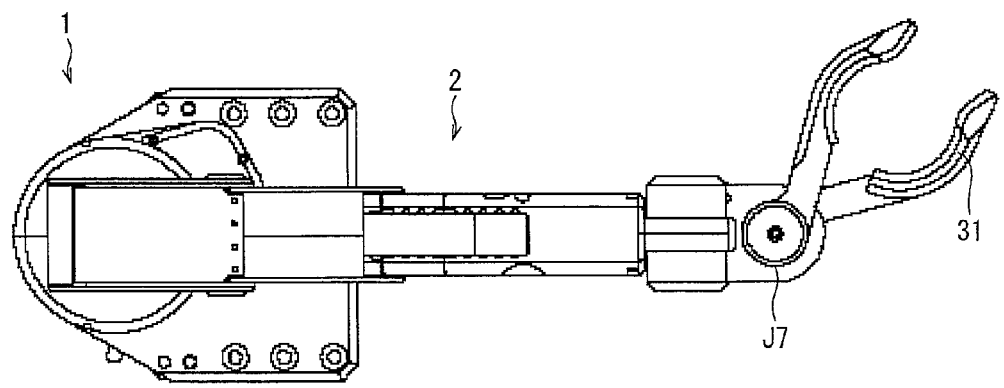
FIG. 24 is a top view illustrating the robot arm according to one embodiment of the present invention, the seventh rotational joint being rotated and the second finger 31 being operated.

The seventh rotational joint J7 is also a bending joint link having a rotational axis vertical to the arm axis and the fifth rotational joint J5. When the seventh rotational joint J7 rotates, the second finger 31 turns around the rotational axis, as illustrated in FIG. 24.

When the sixth rotational joint J6 and the seventh rotational joint J7 are rotationally moved respectively in directions opposite to each other so as to cause respective head portions of the first finger 30 and the second finger 31 to come close to each other, the two-finger hand 32 operates to hold something. On the other hand, when the sixth rotational joint J6 and the seventh rotational joint J7 are rotationally moved respectively in directions opposite to each other so as to cause the respective head portions of the first finger 30 and the second finger 31 to be away from each other, the two-finger hand 32 operates to release an object held in the two-finger hand 32.

When the sixth rotational joint J6 and the seventh rotational joint J7 are rotationally moved in the same direction while the distance between the head portions of the first finger 30 and the second finger 31 is maintained, the two-finger hand 32 operates to change its posture.

With the use of the robot arm 40, according to the present invention, which is arranged as such, it is possible to elongate and contract the arm of the arm section without using any bending joint link. This makes it possible to avoid that an object gets caught between arm sections when bending joint links provided between the arms rotate. That is very significant for an assistive robot arm that works as a hand to help people to do their work in daily life. Further, the telescopic motion of the arm is performed only as linear telescopic motion. In view of this, especially, in a case where the robot arm according to the present embodiment is installed, as an assistive robot arm, at a wheel chair or at a side of a bed, a range of user's view is least blocked by the robot arm, as compared with an arrangement in which bending joint links are provided between arm sections. Further, since the telescopic motion of the arm performed in front of user' eyes is simple and small, the user feels less uncomfortable in terms of his/her eyesight.

Figure 25:
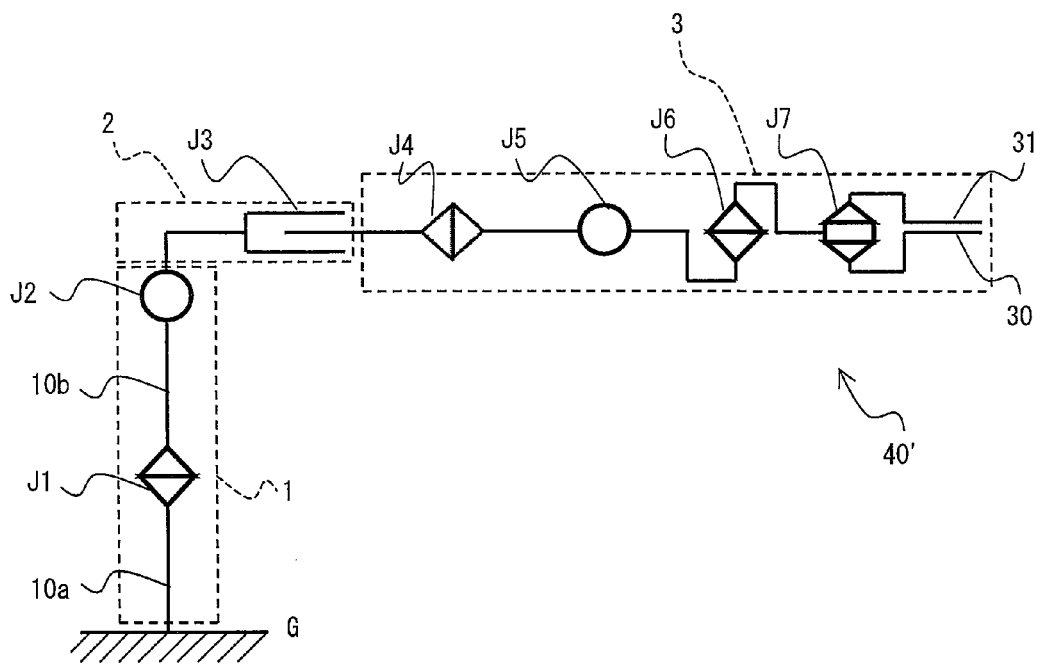
FIG. 25 is a side view illustrating another example of the robot arm according to one embodiment of the present invention.
Figure 26:
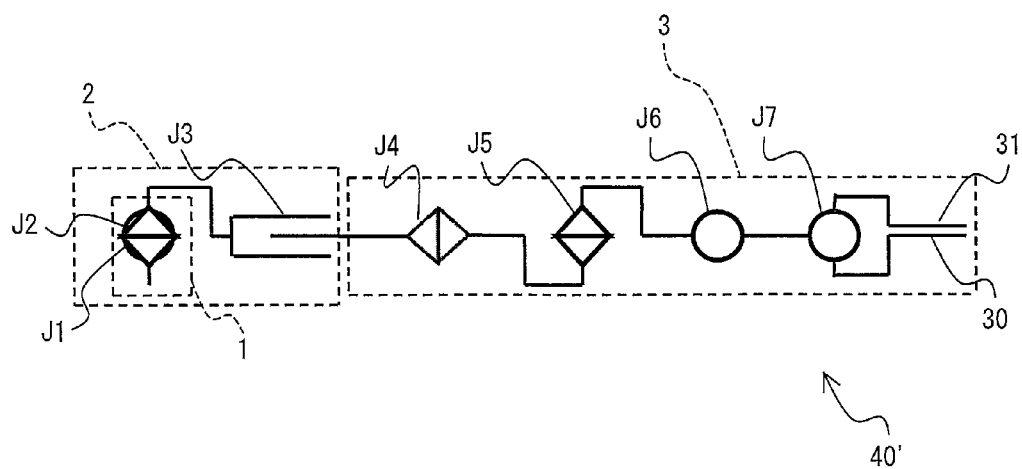
FIG. 26 is a top view illustrating another example of the robot arm according to one embodiment of the present invention.
Figure 27:
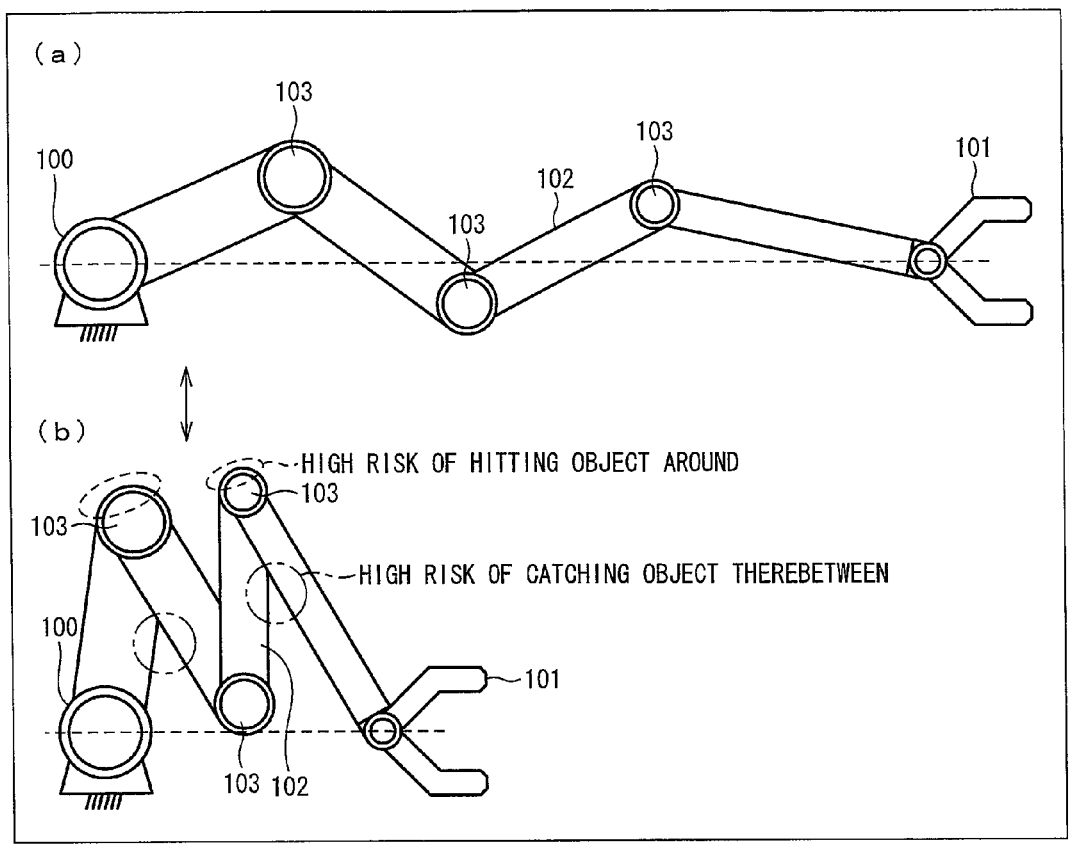
FIG. 27 illustrates a typical example of a robot arm.
Figure 28:
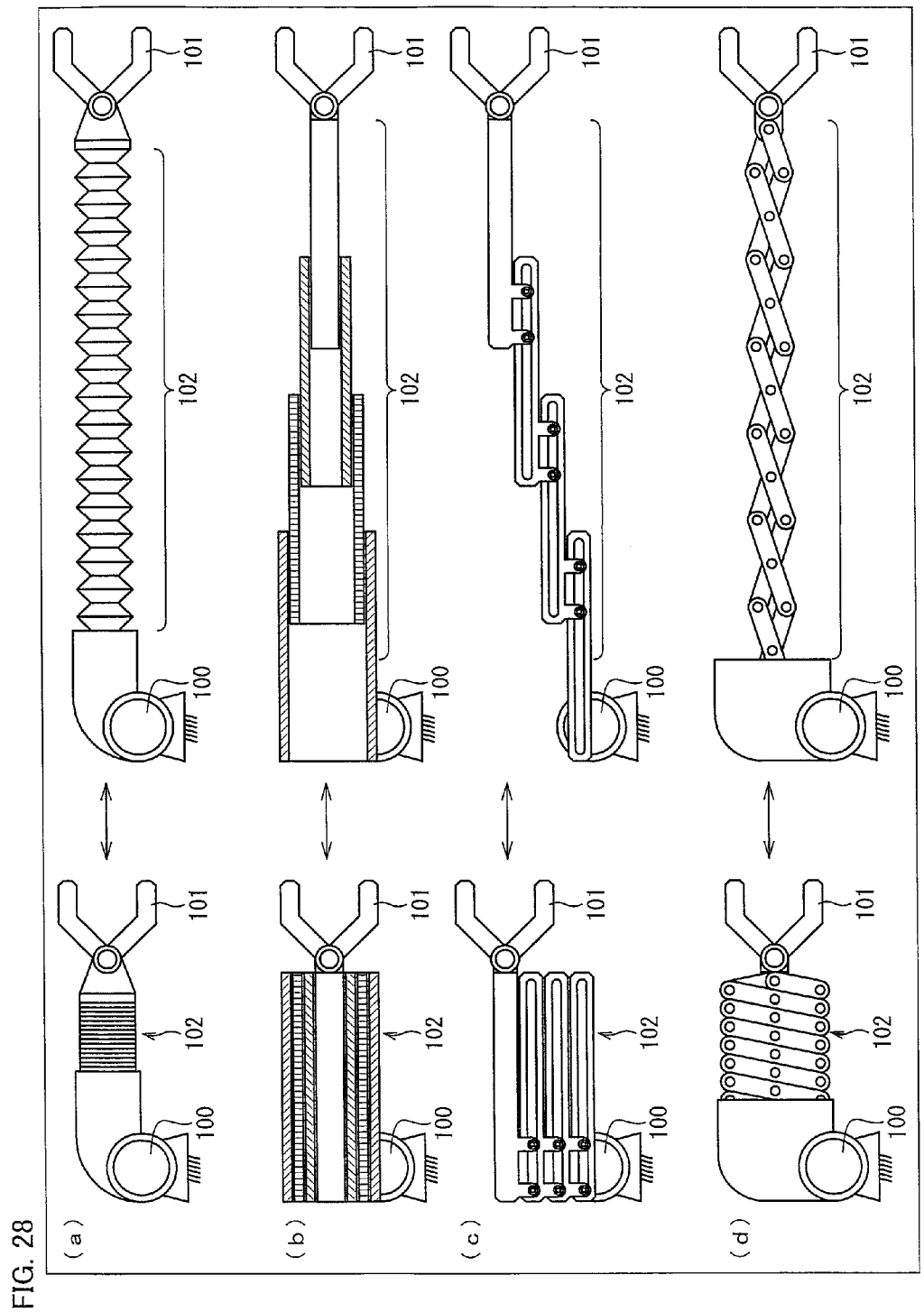
FIG. 28 illustrates typical examples of a robot arm.

In the present embodiment, the hand section 3 causes the two-finger hand 32 to hold or release an object by causing the sixth rotational joint J6 and the seventh rotational joint J7 to operate in response to each other. However, the present invention is not limited to this arrangement. The following deals with another example with reference to FIG. 25 and FIG. 26. A robot arm 40' as another example illustrated in FIG. 25 and FIG. 26 is arranged such that a six rotational joint J6, which is a bending joint link having a rotational axis vertical to both an arm axis and a fifth rotational joint J5, is provided closer to the fifth rotational joint J5 than a seventh rotational joint J7. When the sixth rotational joint J6 rotationally moves, a first finger 30 and a second finger 31 turn around in a uniform manner. That is, the posture of the two-finger hand 32 is changed. In addition, the robot arm 40' of the another example also includes the seventh rotational joint J7 for adjusting the distance between the first finger 30 and the second finger 31. When the seventh rotational joint J7 rotationally moves in a given direction, the two-finger hand 32 operates to hold something. In the meantime, when the seventh rotational joint J7 rotationally moves in a direction opposite to the given direction, the two-finger hand 32 operates to release an object held in the two-finger hand.

The arrangement of the present embodiment that has been described above is merely an example of the invention. That is, the present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

A robot arm according to the present invention includes an arm section having a linear-motion telescopic mechanism constituted by a plurality of block members. The arrangement makes it possible to significantly reduce the risk that an object around the robot arm gets caught between sections of the robot arm and to reduce a space to be occupied by the robot arm.

On this account, the robot arm according to the present invention can be preferably used as not only an industrial robot arm, but also an assistive apparatus such as an assistive robot that works as a hand to help people in daily life activities or a prosthetic limb.

REFERENCE SIGNS LIST

1 Support Member (Basement)
2 Arm Section (Rigid Arm Section)
3 Hand Section (Gripping Section, End Effector)
10a First Support Section
10b Second Support Section
10b' Opening Portion of Second Support Section
20, 20' Block-member Group
21 Moving Means
21' Driving Gear
22, 22' Block Member
22a Side-undulating Structure
22b Upper-surface Corrugated Structure
22c Bottom-surface Corrugated Structure
22c' Recessed Portion
23 Worm-gear Speed Reducer
23a Worm Gear
23a' Rotational Axis of Worm Gear
23b Spur Gear
24 Motor
25 Rope (Movable Coupling Means Between Block Members)
25a Clasp
26 Toothed Belt (Fixing Means Between Block Members, Flexible Belt-like structural member)
26a Corrugated Surface
27 Upper Guide Roller
28 Scraper
29a Interblock Fixing Latch Mechanism
29b Recessed Portion
29c Interblock Movable Coupling Mechanism
29d Tensile Rope
29e Rope Winding Drum
30 First Finger
31 Second Finger
32 Two-finger Hand
40, 40' Robot Arm
41 Guide Mechanism
42 Additional Guide Mechanism
G Installation Surface
J1 First Rotational Joint
J2 Second Rotational Joint
J3 Linear-motion Telescopic Joint
J4 Fourth Rotational Joint
J5 Fifth Rotational Joint
J6 Sixth Rotational Joint
J7 Seventh Rotational Joint

The invention claimed is:

1. A linear-motion telescopic mechanism comprising:
a block-member group including a plurality of block members;
moving means which moves the plurality of block members and which has a function of fixing a given block member to another block member in the block-member group and of unfixing fixed block members one by one,
the moving means causing a part of or all of the plurality of block members in the block-member group to align in a linear and rigid manner to form a rigid alignment, and unfixing a part of or all of the rigid alignment to disengage the block members one by one, so that the rigid alignment serves as a linear rigid arm section that is freely variable in length,
each of the plurality of block members has a corrugated structure on its surface as means for fixing said each of the plurality of block members to its adjacent block member so as to form the rigid arm section,
the linear-motion telescopic mechanism further comprising:
a flexible belt-like structural member (i) which extends along block members aligning to form the rigid arm section and (ii) which has a corrugated surface; and
a mechanism for engaging the corrugated structures of the plurality of block members with the corrugated surface of the flexible belt-like structural member,
wherein the block members have side-undulating structures configured to mesh with corresponding side-undulating structures in adjacent block members when the block members are disengaged from the belt-like structural member.

2. The linear-motion telescopic mechanism as set forth in claim 1, further comprising, as means for unfixing a part of or all of the rigid arm section to disengage the block members in the rigid arm section one by one, a mechanism for separating the corrugated surface of the flexible belt-like structural member from the corrugated structures of the plurality of block members.

3. The linear-motion telescopic mechanism as set forth in claims 1, wherein:
the moving means has a driving mechanism composed of a worm gear and an actuator for rotating the worm gear,
each of the plurality of block members has a corrugated structure on its surface facing the worm gear so that the corrugated structure engages with a tooth of the worm gear, thereby moving the plurality of block members in an alignment direction by rotation of the worm gear.

4. A robot arm comprising:
an installation section to be fixed to a desk or a floor;
a support member connected to the installation section via a first rotational joint;
a straight-link arm section connected to the support member via a second rotational joint that is rotatable in a vertical direction to the first rotational joint; and
an end effector provided at an end of the arm section,
the arm section having a linear-motion telescopic mechanism recited in claim 1, (i) which allows the arm section to be elongated or contracted to an arbitrary arm length and (ii) which is constituted by structural members provided in advance to achieve a maximum arm length, the linear-motion telescopic mechanism being arranged to separate, from the arm section, a part of the structural members that is beyond the arbitrary arm length and to house the part into a space deviating from a central axis of the arm section along an elongate direction of the arm section.

5. The robot arm as set forth in claim 4, wherein:
the end effector is composed of a gripping section including a grip-base portion, a grip-palm portion, and a plurality of finger portions,
the robot arm further comprising:
a fourth rotational joint provided between the grip-base portion and the linear-motion telescopic mechanism so as to be parallel to a longitudinal direction of the linear-motion telescopic mechanism;
a fifth rotational joint provided between the grip-base portion and the grip-palm portion so as to be vertical to the fourth rotational joint; and
rotational joints that are controlled independently provided between the grip-palm portion and a corresponding one of the plurality of finger portions.

6. The robot arm as set forth in claim 5, wherein:
the plurality of finger portions provided in the gripping section is configured to hold another structure, and
the plurality of finger portions are configured to open or close in synchronization.

7. The robot arm as set forth in claim 4, wherein:
the end effector is composed of a gripping section including a grip-base portion, a grip-palm portion, and a plurality of finger portions,
the robot arm further comprising:
a fourth rotational joint provided between the grip-base portion and the linear-motion telescopic mechanism so as to be parallel to a longitudinal direction of the linear-motion telescopic mechanism;
a fifth rotational joint provided between the grip-base portion and the grip-palm portion so as to be vertical to the fourth rotational joint;
a sixth rotational joint between the grip-palm portion and the plurality of finger portions so as to cause the plurality of finger portions to turn around in a collective manner; and
a seventh rotational joint(s) for adjusting a distance between one of the plurality of finger portions and the other(s) of the plurality of finger portions by independently operating the other(s) of the plurality of finger portions with respect to one of the plurality of finger portions, the seventh rotational joint(s) being provided between the grip-palm portion and the other(s) of the plurality of finger portions.

8. The robot arm as set forth in claim 4, wherein:
the end effector is an image-capture device.

* * * * *